Feb. 11, 1930.  W. A. RHODES ET AL  1,746,793
TRUNKING SYSTEM
Filed Aug. 17, 1927     12 Sheets-Sheet 1
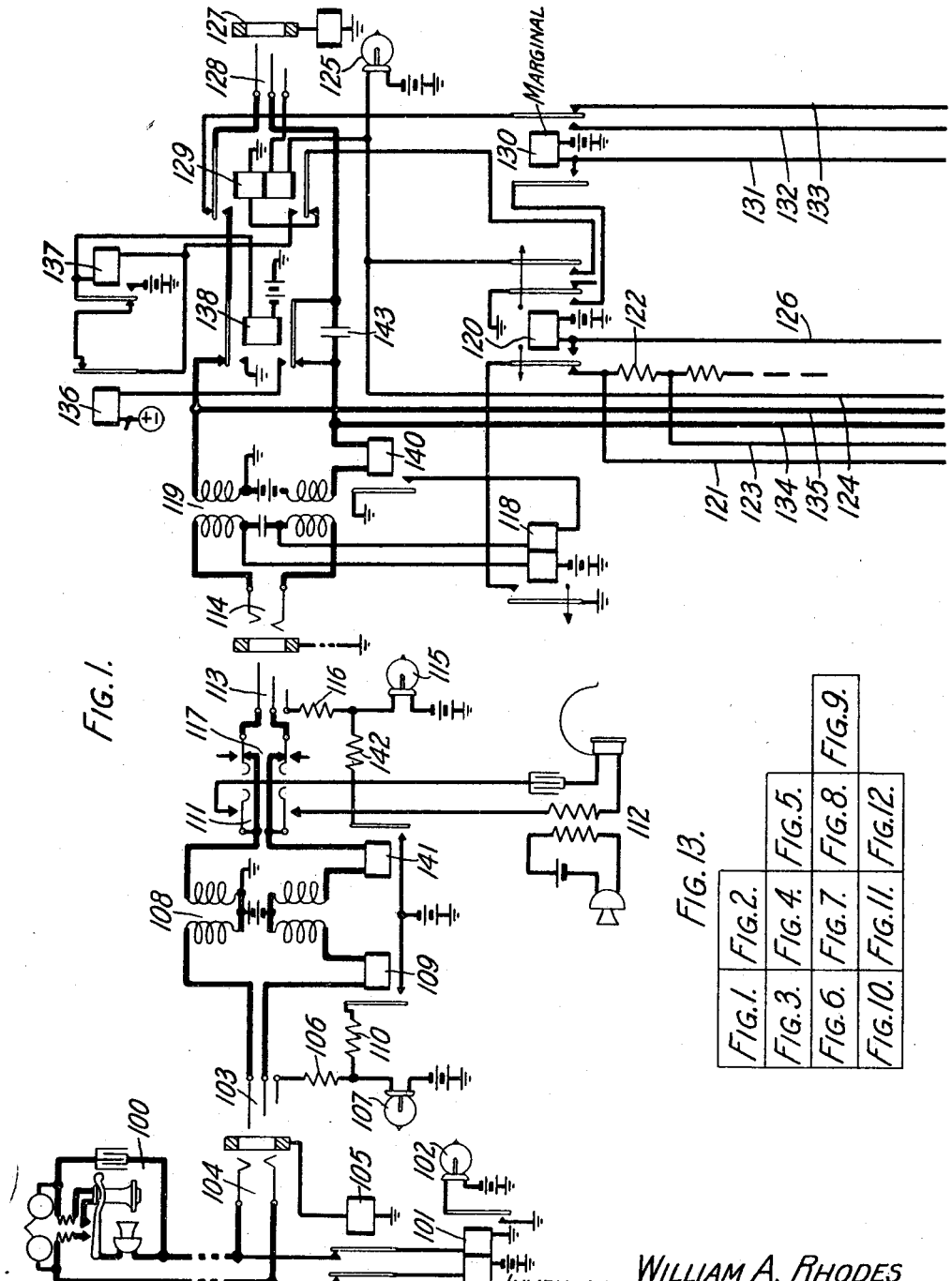
INVENTORS: WILLIAM A. RHODES
JACK F. C. DAHL
By P. C. Smith
ATTORNEY Feb. 11, 1930.   W. A. RHODES ET AL   1,746,793
TRUNKING SYSTEM
Filed Aug. 17, 1927   12 Sheets-Sheet 2

INVENTORS: WILLIAM A. RHODES
JACK F. C. DAHL
BY P. C. Smith
ATTORNEY

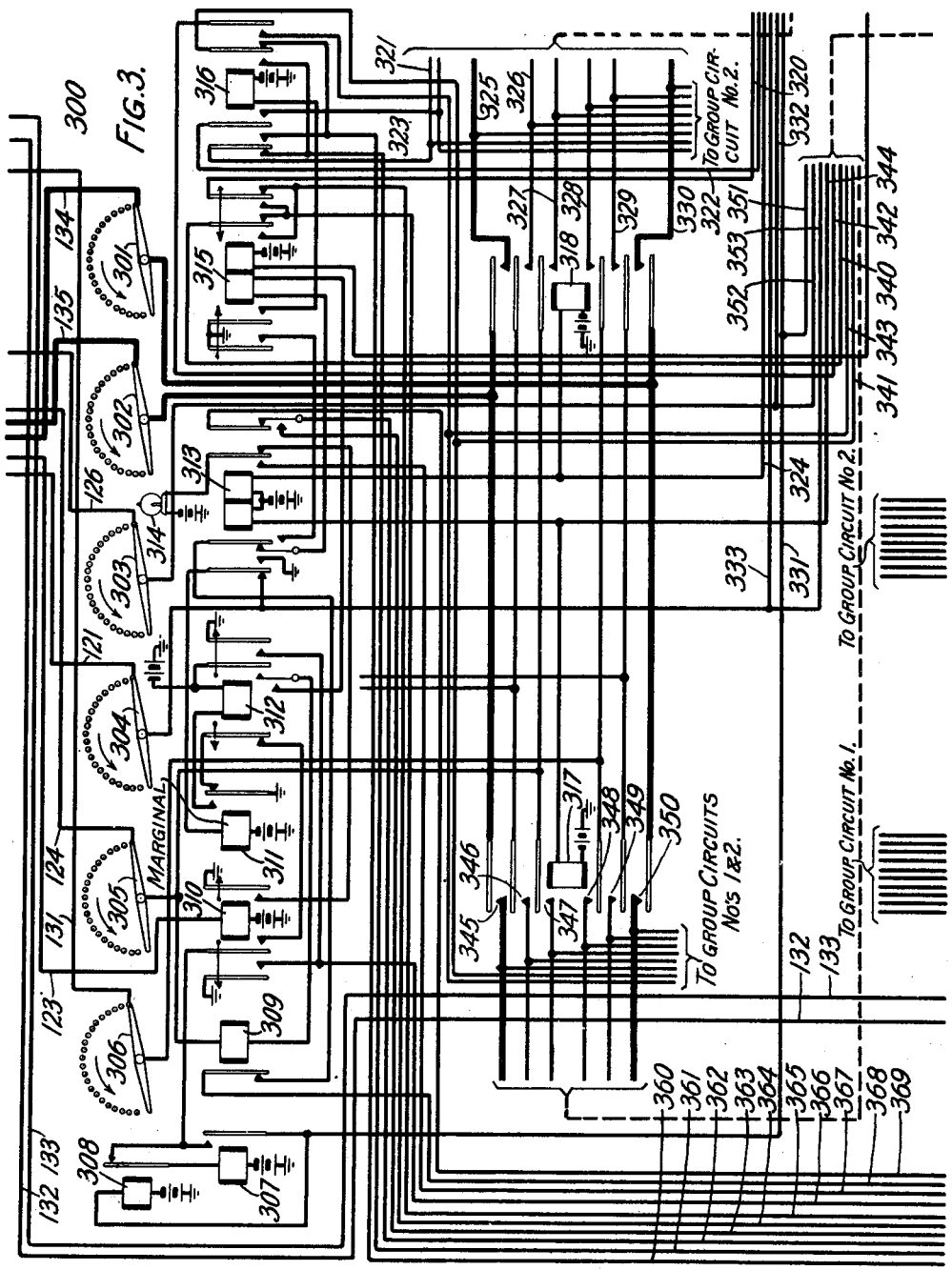

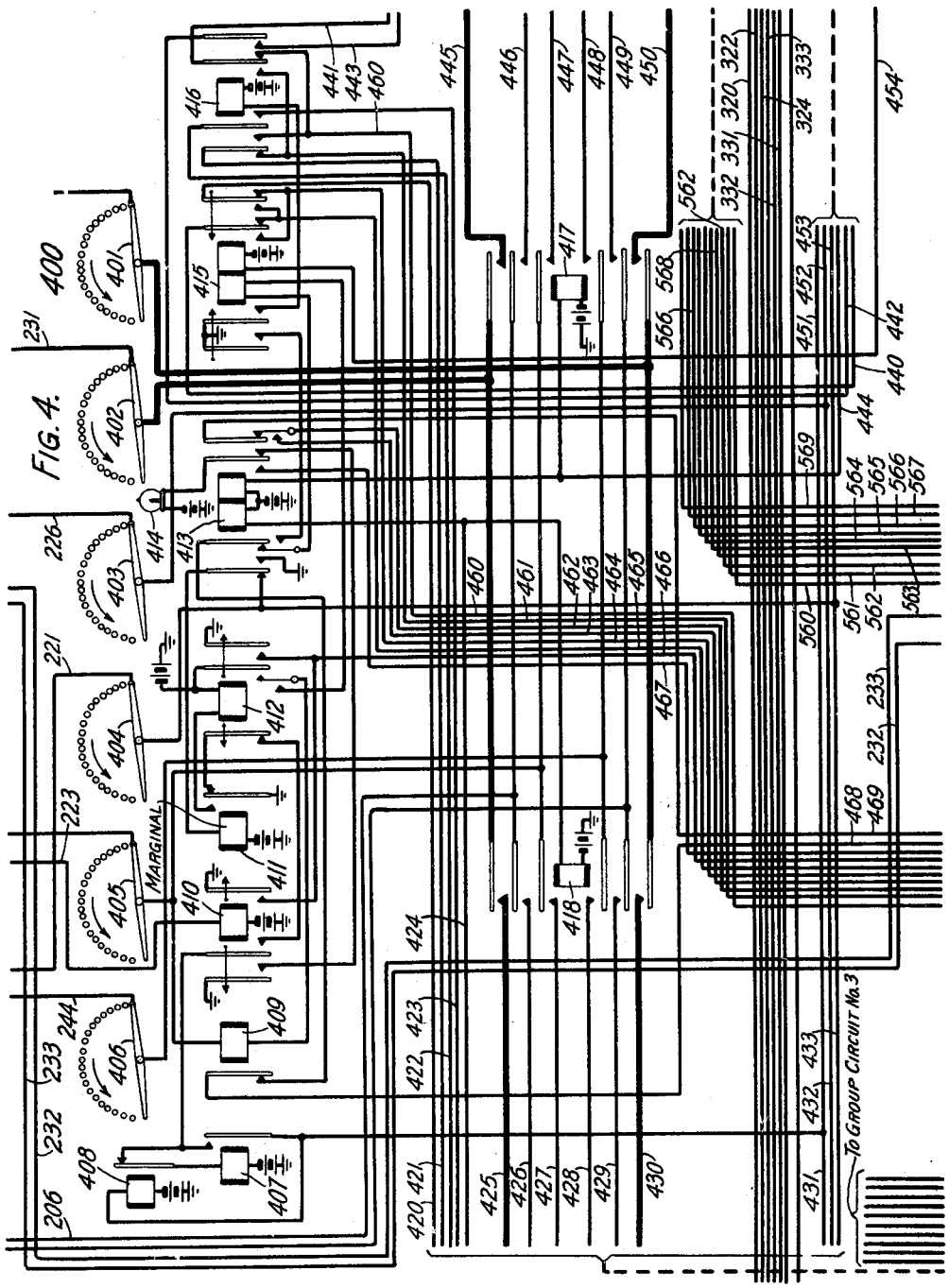

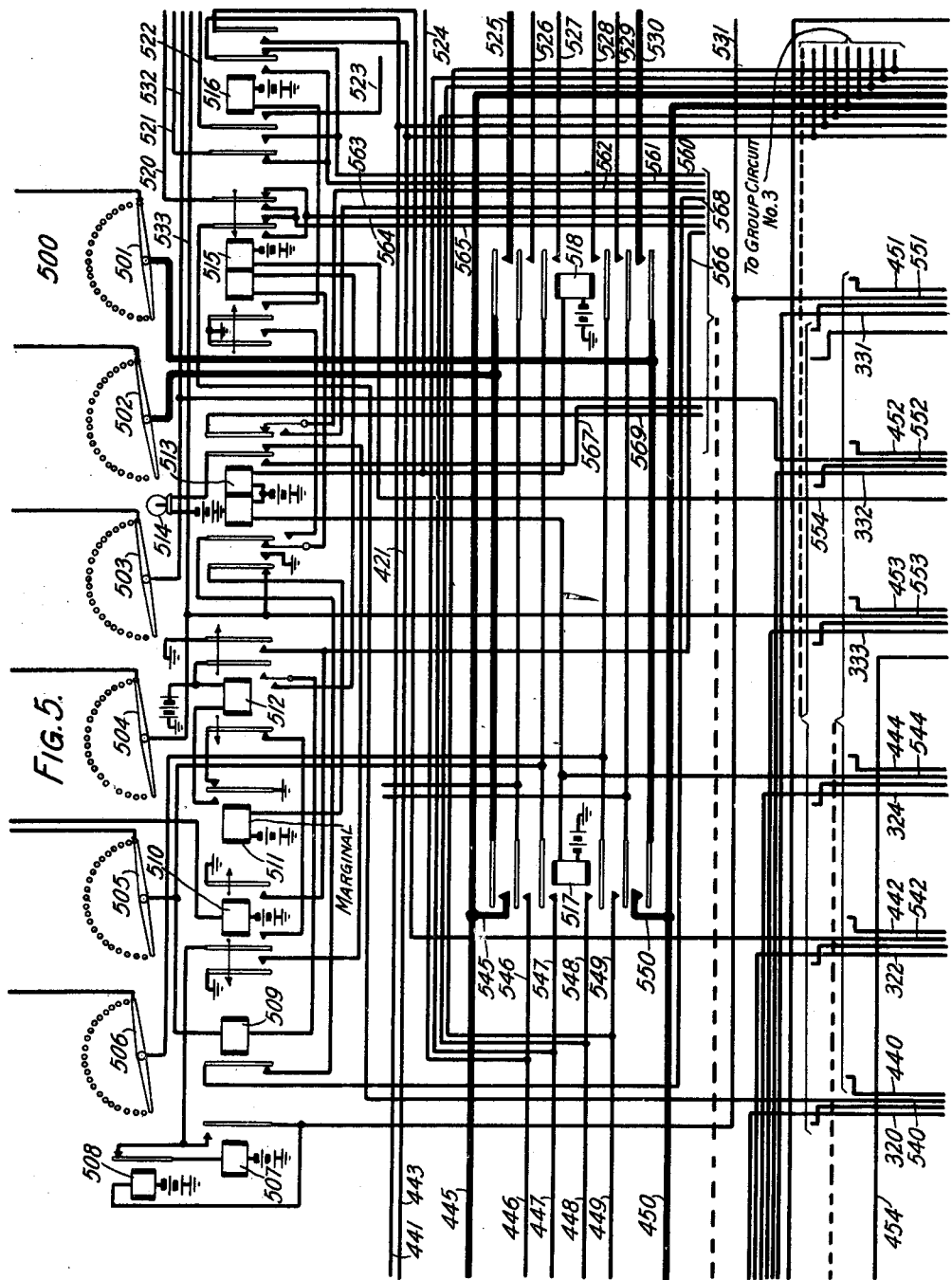

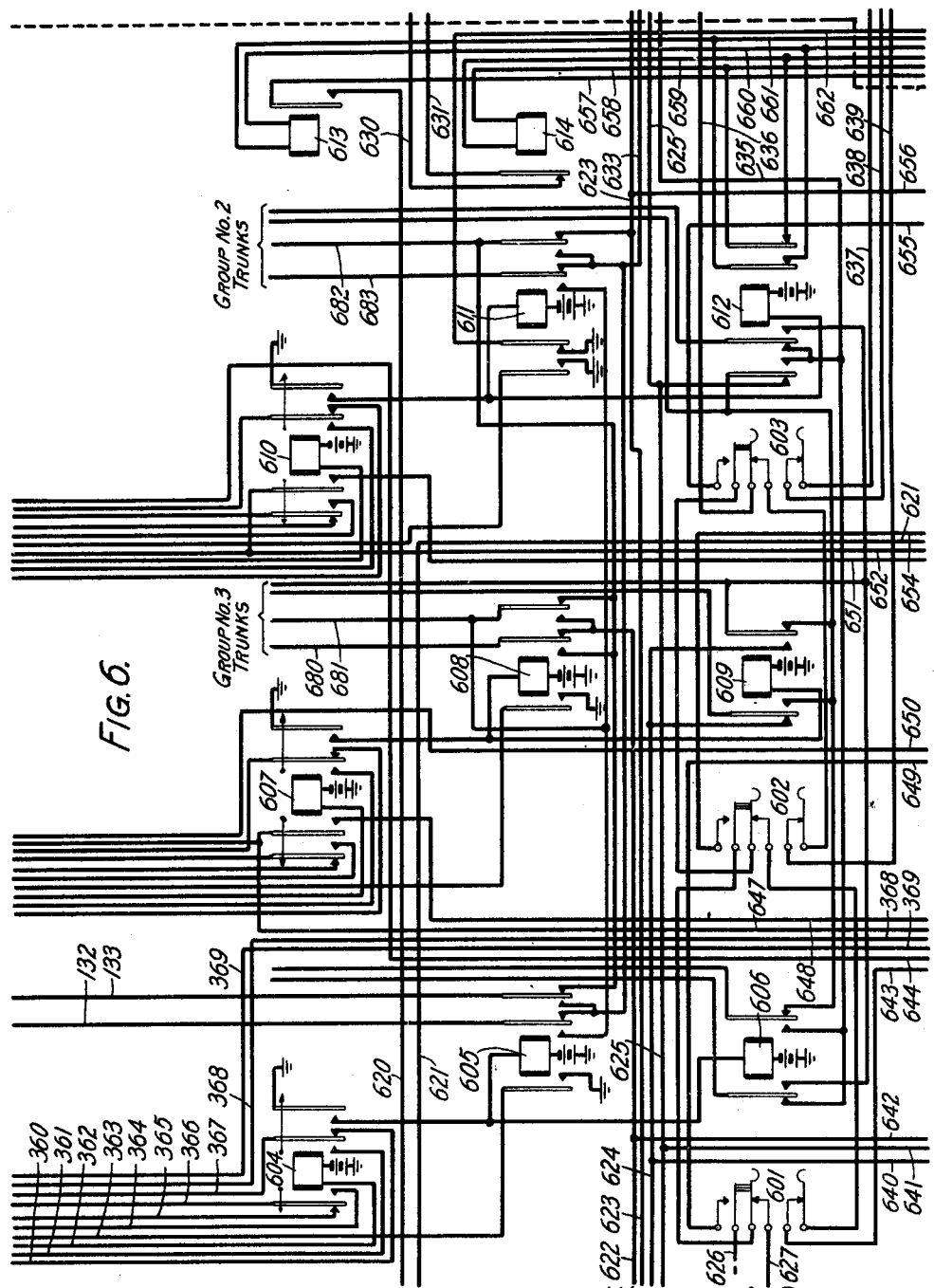

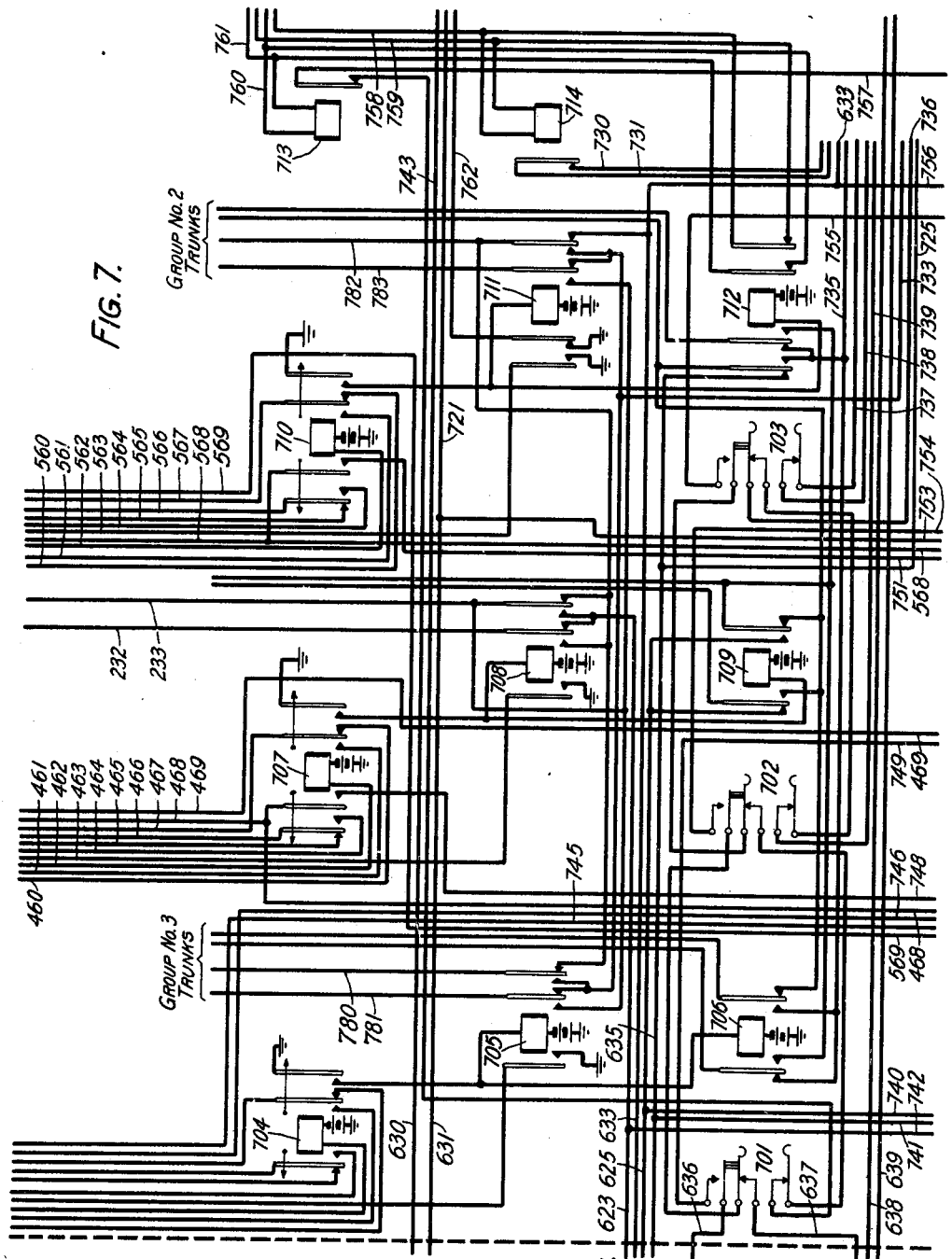

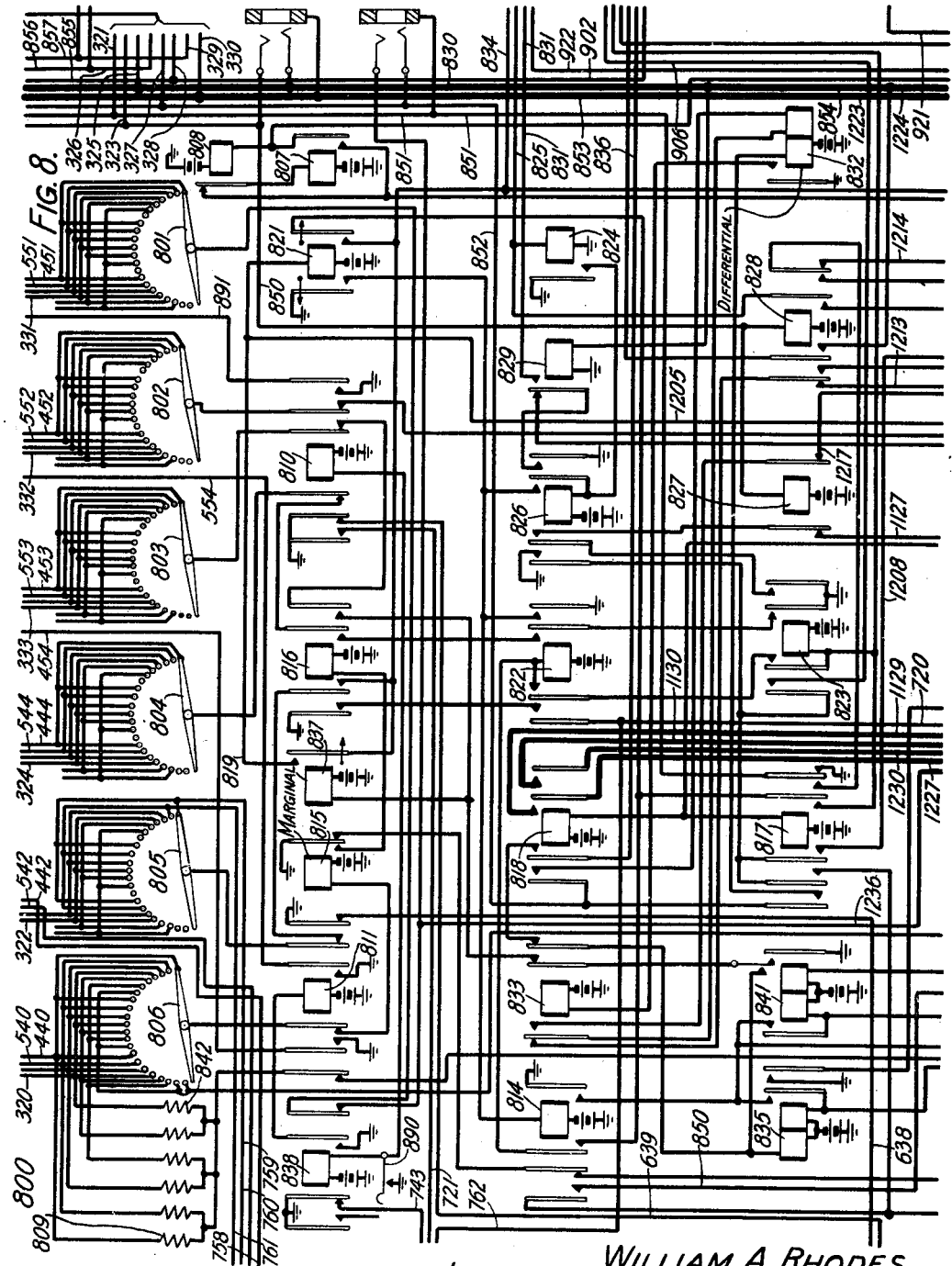

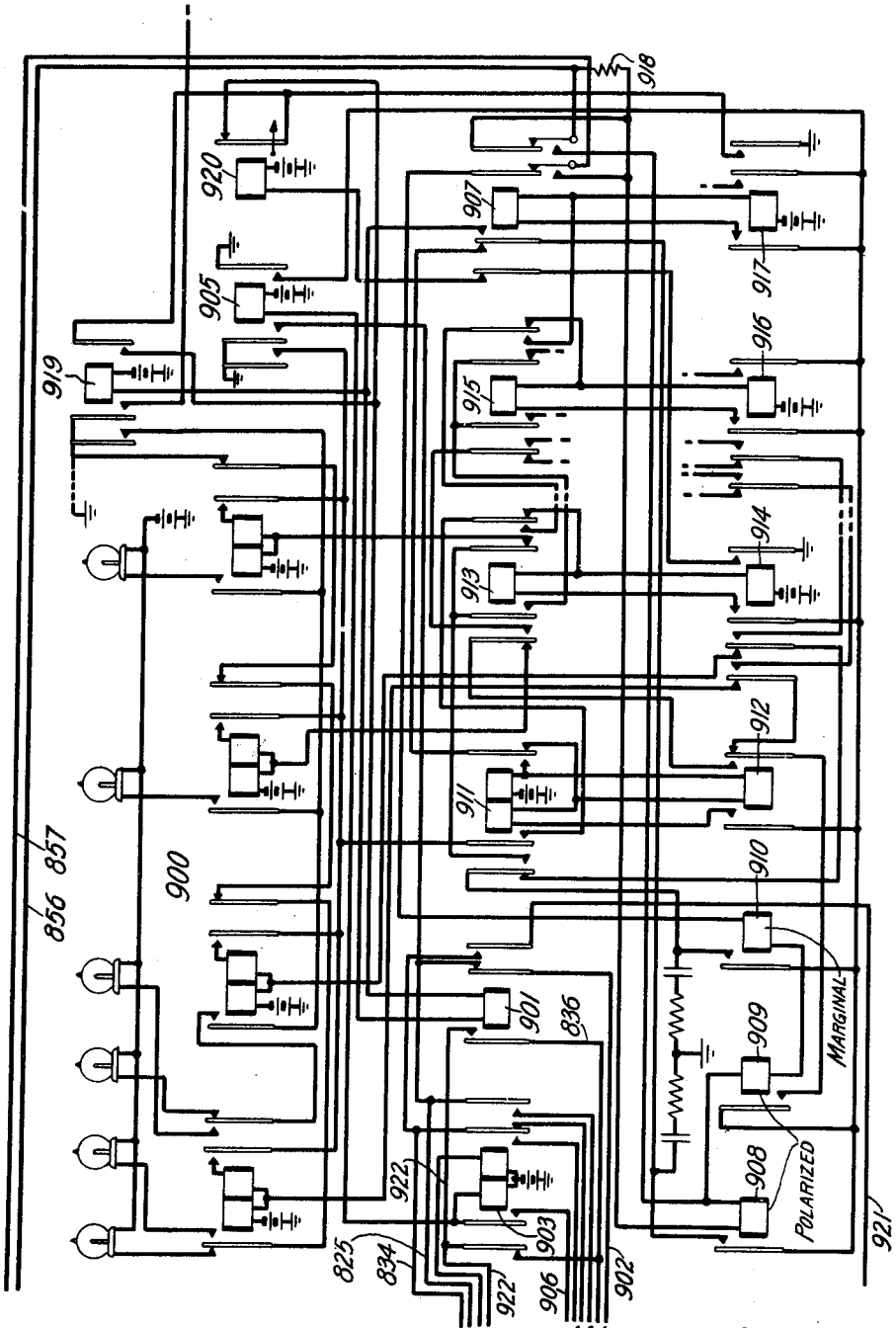

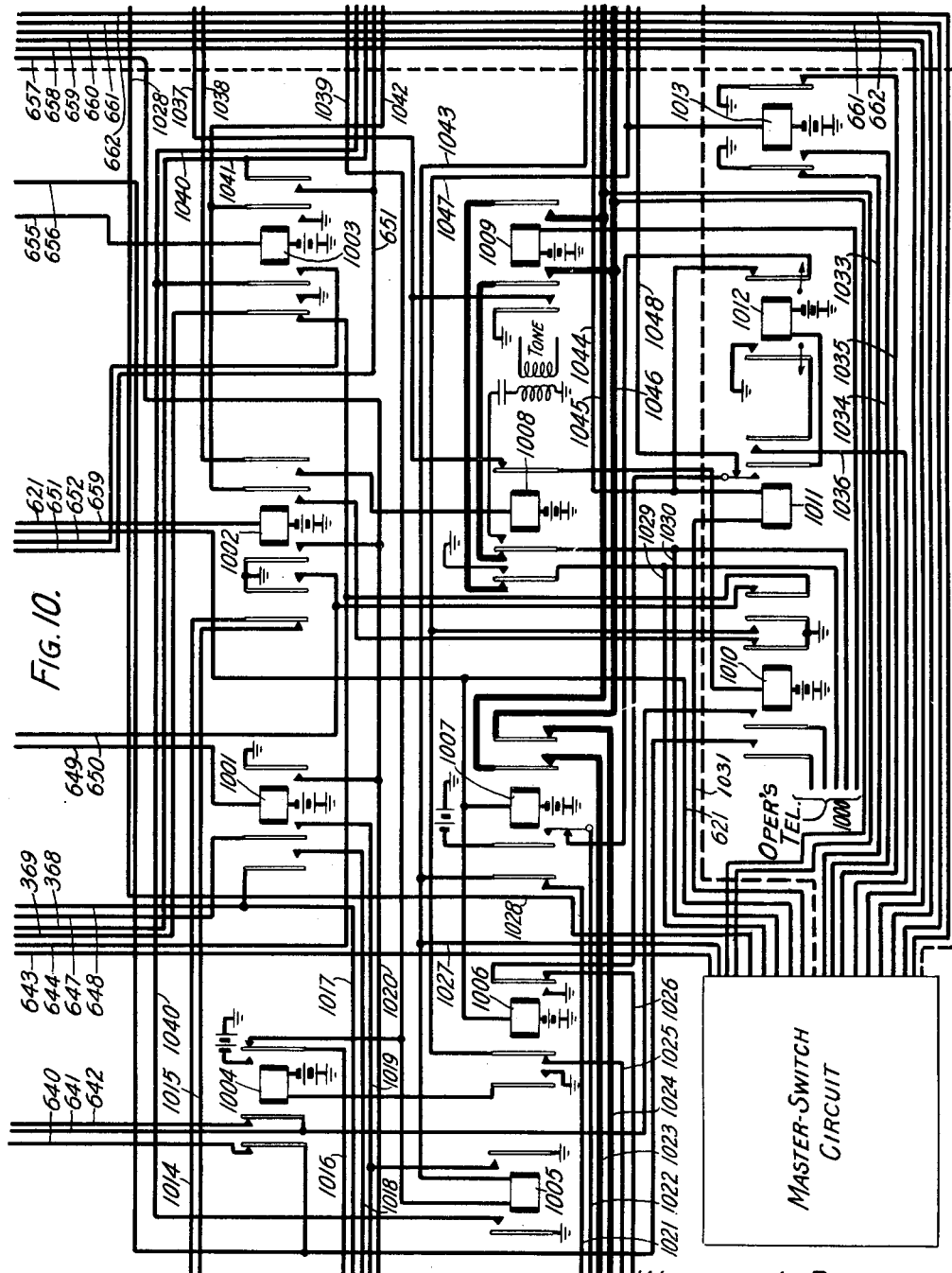

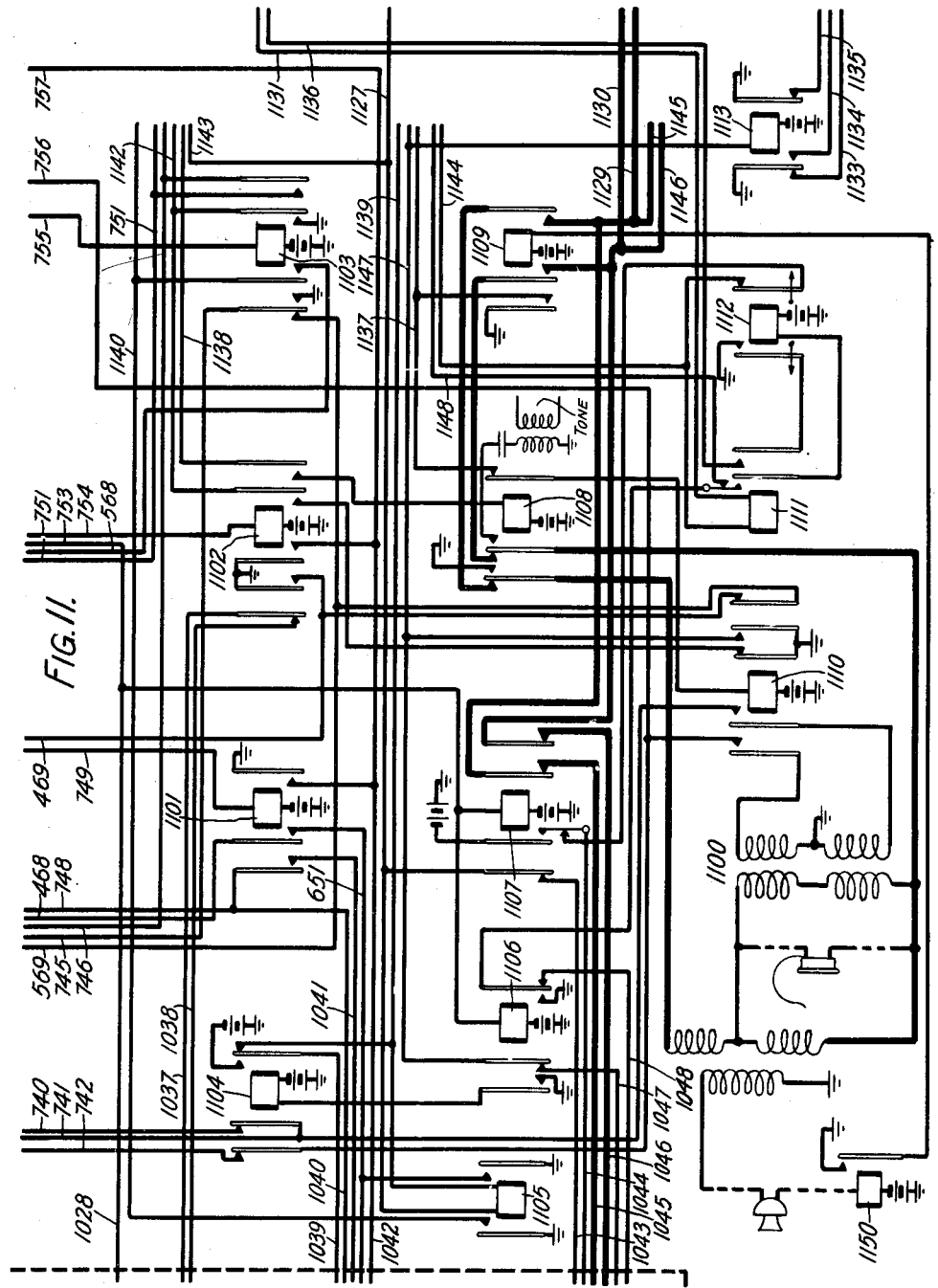

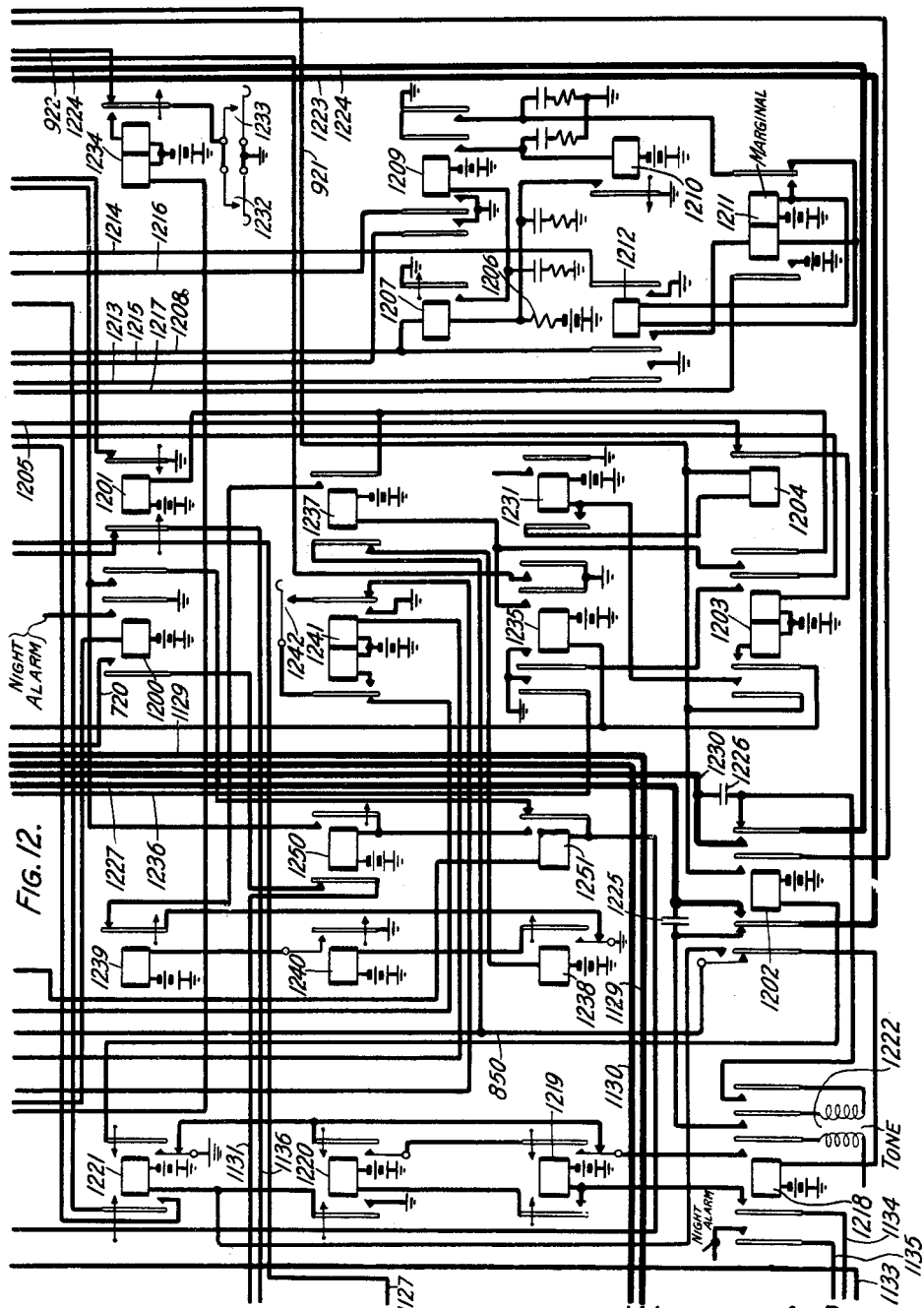

Patented Feb. 11, 1930

1,746,793

UNITED STATES PATENT OFFICE

WILLIAM A. RHODES, OF NEW YORK, N. Y., AND JACK F. DAHL, OF NEWARK, NEW JERSEY; SAID RHODES ASSIGNOR TO AMERICAN TELEPHONE AND TELEGRAPH COMPANY, A CORPORATION OF NEW YORK, AND SAID DAHL ASSIGNOR TO WESTERN ELECTRIC COMPANY, INCORPORATED, OF NEW YORK, N. Y., A CORPORATION OF NEW YORK

TRUNKING SYSTEM

Application filed August 17, 1927. Serial No. 213,506.

This invention relates to telephone systems and has for its object to increase the facility with which telephone connections may be completed.

Heretofore trunks incoming at a manual office from other manual offices and from machine switching offices terminated before different operators. Likewise the association of an indicator with a trunk from a machine switching office as well as team work between adjacent operators has been under manual control.

In accordance with the present invention, trunks incoming from machine switching and manual offices may be served at the same position, which is provided with equipment which discriminates between the two types of trunks and automatically associates the trunk with the proper means for informing the operator of the called number. In addition, the position equipment is so arranged that an incoming call may be served by any one of a plurality of positions, and signaling and testing is altered in accordance with the position used.

In accordance with a specific embodiment of the invention, the trunks appearing at any position are divided into three groups. There is a group circuit individual to each group, and a position or master circuit individual to each position which may associate itself through a group circuit with a trunk. Each position which may serve trunks incoming, from a machine switching office is provided with a recorder for indicating the called line number. In addition each position is provided with three keys. By means of these keys operator's divisions of any desired size may be created; that is, the switchboard may be divided into sections containing any number of trunk groups greater than three, since the operation of a key separates the groups on either side of it. The equipment is so arranged that, in general the operation of a key permits the group circuits at the ends of the operator's divisions to cause the automatic association of a trunk with either the master circuit of the position at which the trunk appears or with the master circuit of an adjacent position so that an incoming call may be completed either by the home operator to whose division it is assigned or by an adjacent, or team operator. The signals associated with the trunk and group circuits may be operated at either of two rates to selectively signal the two operators and the discrimination between home and team operators also discriminates between the rates of signaling. The operation of the keys above mentioned to create operator's divisions differing from the physical positions, also alters the signaling circuits to correspond.

A call incoming over a trunk circuit causes the group circuit to which the trunk belongs to associate itself therewith and to summon a master circuit, which locks up with the group circuit. The master circuit then determines whether it is connected with a trunk from a manual or a machine switching office, since trunks of both kinds may appear in the same group. The trunk and group circuit lamps are then lighted intermittently at a rate dependent upon whether the master circuit belongs to the home operator's division or to a team operator's division. The master circuit now associates a call indicator with the trunk causing the machine switching sender to send out impulses for operating the indicator in the well known manner, or it applies a tone to the trunk to indicate that the operator is ready to receive the number. As soon as the number has been received, either orally or visually, the operator depresses the release key, releasing the master circuit and group circuit from the trunk. She then tests the line in the usual manner and, inserting the plug in the line jack if the line is idle, causes ringing to take place and the connection to be completed. The operation of the release key advances the group circuit switch to the next trunk and the master circuit switch to the next group, to distribute the handling of calls among the trunks.

A clearer understanding of the invention may be obtained from the following detailed description and the attached drawing in which:—

Fig. 1 shows a subscriber's line at a manual office together with an operator's cord, and a trunk to a second manual office;

Fig. 2 shows a subscriber's line at a machine switching office together with a schematic showing of switching means for extending the line to a trunk to a manual office;

Figs. 3, 4 and 5 show respectively groups of trunks, No. 3 of one operator's position and Nos. 1 and 2 of the right adjacent position;

Figs. 6 and 10 show the splitting keys together with relays for controlling the splitting, switching and sequential order of the groups of the position to which the group circuit No. 3 of Fig. 3 belongs;

Figs. 7 and 11 duplicate Figs. 6 and 10 for the position to which group circuits Nos. 1 and 2 shown in Figs. 4 and 5 belong;

Figs. 8 and 12 show the master switch and circuit individual to the position shown in Figs. 7 and 11;

Fig. 9 shows a portion of the well known relay call indicator which is individual to the position shown in Figs. 7, 8, 11 and 12;

Fig. 13 shows the manner in which Figs. 1 to 12 inclusive should be arranged.

The trunk circuit of Fig. 1, the group circuit of Fig. 3, the position circuit of Figs. 6 and 10 and the master switch circuit indicated by the rectangle at the lower left hand corner of Fig. 10 are located at one physical position which will be called position A, while the trunk of Fig. 2, the group circuits of Figs. 4 and 5, the position circuit of Figs. 7 and 11, the master switch circuit of Figs. 8 and 12 and the relay call indicator of Fig. 9 are located at a second physical position which will be called position B. Position A is provided with keys 601, 602 and 603; position B with keys 701, 702, and 703. Key 601 separates position A from the adjacent left position. Key 602 operated alone associates group 1 with the next left position, associates groups 2 and 3 with position B and renders position A unusable as a home position unless the corresponding key, key 702, in the adjacent right position is also operated. Key 603 associates groups 1 and 2 with the next left position and group 3 with the next right position. Keys 701, 702 and 703 function similarly. With keys 601, 701 and similar keys operated, an operator is required at each division, each of which is made up of the three groups of the physical position. With keys 602, 702, etc., operated, the divisions consist of groups 2 and 3 of one position and group 1 of the next right position. The key in the first and last position of the switchboard is left unoperated and these divisions are larger. With keys 603, 703, etc., operated, the divisions consist of group 3 of one position and groups 1 and 2 of the next right position. As above, the grouping differs at the ends of the switchboard.

Divisions of any size may be created by operating the proper keys. The operator's telephone is connected with the position circuit by a plug and jack and where a division covers more than one position, she may occupy any full position, but may not occupy one where the key corresponding to key 602 is operated and the division extends beyond the next such key.

It is believed that the further discussion of the relations between positions and divisions as well as the team work between divisions will be simplified by tracing the operation of the circuits in the simplest case, that is, with keys 601, 701, etc., operated. An attempt has been made to use corresponding numbers where the apparatus and circuits are duplicated in adjacent figures. However, in some instances the conductors extend from one figure to the next and this has been impossible. In some instances conductors have been grouped and carried from figure to figure as a single dotted conductor. Since numbers have been applied to such conductors both before and after grouping, no confusion should result. The establishment of a connection from the subscriber at machine switching substation 200 to the subscriber whose line jack is represented at 227 will first be described.

*Establishment of connection from machine switching office*

The preparation of the grouping circuits for the receipt of a call will first be described. The operation of key 701 completes a circuit from battery, through the winding of relay 1101, conductor 749, upper closed contact of key 701, conductor 636, upper normal contact of key 603, lower normal contact of key 602, conductor 639 to ground at the outer left back contact of relay 810. It will be noted that this circuit depends on the two keys to the left of the operated key being normal. A similar condition exists with regard to each key, wherefore the closure of any key disables the two keys to the right of it. Therefore, an operator's division comprises, at a minimum, three trunk groups.

Relay 1101 operates in the above traced circuit, closing a circuit from ground at its right front contact, conductor 757, back contact of relay 713, conductor 630, back contact of relay 614, conductor 631, conductor 753, windings of relays 1106 and 1107 in parallel to battery. Relays 1106 and 1107 operate, relay 1106 closing an obvious circuit for relay 1104. Similarly, the operation of key 601 causes the operation of relay 1001, relay 1001 causes the operation of relays 1006 and 1007, and relay 1006 operates relay 1004.

Relay 1104 connects battery over its right front contact to conductor 1039 and the winding of relay 1005. Relay 1107 connects battery over its left front contact to conductor 1044 and the winding of relay 1011. Similarly relays 1105 and 1111 receive battery from the adjacent right position over conductors 1139 and 1144 respectively, while relays 1004 and 1007 connect battery to conductors 1016 and 1022 respectively. Relays 1006 and 1106 supply ground over their right front contacts by which relays 1012 and 1112 may be operated as subsequently described.

With this arrangement an operator is located at each position. The connection of the operator's headset 1100 to the position equipment by a plug and jack (not shown) completes a circuit for relay 1150, which in turn closes a circuit for relay 1109. Relay 1109 in turn operates relay 1110 over the right back contact of relay 1108, and relay 1110 operates relay 1113. Similarly the association of a headset 1000 with position A causes the operation of relays 1009, 1010, and 1013. It will be noted that the operation of relays 1009 and 1109 connects the operator's telephone circuits 1000 and 1100 to the master switches of the respective positions and that the operation of relays 1007 and 1107 disconnects the master switch from the operator's telephone of the next left position. The position equipment is now in readiness to receive a call.

The initiation of a connection by the subscriber at substation 200, the association of the sender 212 with the line and the selection of an idle trunk by district selector 213 under the control of the sender take place substantially as described in U. S. Patent 1,589,402, granted to O. H. Kopp, June 22, 1926. When the trunk has been selected, the sender connects a relay across the tip and ring conductors, completing a circuit from battery through the left winding of relay 218, upper left winding of repeating coil 219, upper back contacts of relays 248 and 245, through district selector 213 to the sender relay, back through the district selector, lower back contacts of relays 245 and 248, lower left winding of repeating coil 219, right winding of relay 218 to ground. Relay 218 operates closing ground at its front contact over the back contact of relay 220 to conductor 221 directly and through resistance 222 to conductor 223. Conductor 223 is common to all trunk circuits of the group, there being a resistance, like resistance 222, for each trunk. The grounding of conductor 223 completes a circuit through the winding of relay 410 to battery while the grounding of conductor 221 which is individual to the trunk marks the terminal corresponding to the trunk in the bank of brush 404 of the group selector 400.

Relay 410 operates connecting ground to conductor 466 and also closing a circuit from battery through the winding of relay 407, back contact of magnet 408, inner left contact of relay 410, back contact of relay 412, back contact of relay 411 to ground. Relay 407 closes a circuit from battery through the winding of magnet 408, front contact of relay 407 to the operating ground for relay 407. Magnet 408 operates opening the circuit of relay 407, which releases, in turn opening the circuit of magnet 408 to release the magnet and step the brushes of switch 400 to the next terminal in search of the marked trunk.

When group switch 400 finds the trunk over which the call is incoming, a circuit is completed from battery through the winding of relay 411, left back contact of relay 413, brush 404 to grounded conductor 221. Relay 411 in operating disconnects ground from the circuit of relay 407 to prevent the advance of switch 400 from the terminals of the calling trunk. It also closes a circuit from battery through the winding of relay 412 to ground at the right front contact of relay 411. Relay 412 closes a substitute ground to conductor 466. It likewise closes battery to the winding of relay 409 for a purpose which will be explained later, and prepares a circuit for relay 415 which is not completed at this time.

Relay 410 in operating closes a circuit from ground at its left front contact, inner right back contact of relay 413, through lamp 414 to battery. Lamp 414 lights, indicating that a call is incoming in the group No. 1 served by switch 400.

The connection of ground over the right front contact of relay 410 to conductor 466 completes a circuit extending over the left back contact of relay 707, conductor 465, inner right back contact of relay 415, conductor 449 and thence in parallel through resistance 809 over the outer left back contact of relay 811 to battery through the winding of relay 1200, for the purpose of initiating the operation of master switch 800, and to the terminal of brush 806 corresponding to group No. 1 for the purpose of marking that group to the master switch. The operation of relay 1200 closes a circuit from battery through the winding of relay 807, back contact of magnet 808, outer right front contact of relay 1200, back contacts of relays 1251 and 814 to ground at the back contact of relay 815. Relay 807 operates magnet 808 and this relay and magnet release in the same manner as relay 407 and magnet 408, advancing switch 800 to the terminal marked by the grounding of conductor 440. When brush 806 makes contact with conductor 440, a circuit is completed over the inner left back contact of relay 811 to the winding of relay 815 and battery. Relay 815 in operating removes ground from the circuit of relay 807, preventing the advance of the master switch beyond the terminal connected to the conductor 440. It also closes a circuit from ground at its front contact through the winding of relay 816 to battery.

Relay 816 in operating closes a circuit from battery through the winding of relay 837, outer right contact of relay 816, inner right back contact of relay 810, brush 803, conductor 453, brush 404 to grounded conductor 221. Relay 837 in operating closes a circuit from battery through the winding of relay 821, and in parallel therewith from battery through the right winding of relay 1203, back contact of relay 1204, conductor 1205, and thence over the front contact of relay 837 to ground at the right contact of relay 1201. Relay 821 in operating closes a circuit from battery through the winding of relay 814, to ground at the left front contact of relay 821. With relay 814 operated a circuit is closed from battery through the winding of relay 822, inner left front contact of relay 814, right front contact of relay 821 to ground at the right back contact of relay 1201. The operation of relay 1203 is ineffective at this time, but is an indication that the trunk is connected to relay 218 and that relay 218 is operated, for which purpose it will be used later. Relay 822 in operating closes a holding circuit for relay 814 at its outer right front contact.

The operation of relay 1200 also closes a circuit from ground at the left back contact of relay 711, conductor 762, conductor 720, left front contact of relay 1200, back contact of relay 1250, conductor 1131, winding of relay 1111, over conductor 1144, to battery in the next adjacent right position as hereinbefore described. Relay 1111 in operating closes a circuit from battery through the winding of relay 1112, inner right front contact of relay 1111, to ground at the right front contact of relay 1106. Relays 1112 and 1111 operated, close a circuit from ground over the front contact of relay 1112, outer right front contact of relay 1111, conductor 1136, left back contact of relay 1201, windings of relays 817 and 818 in parallel to battery. With relay 817 operated, a circuit is closed from battery through the winding of relay 823, inner right front contact of relay 817, right front contact of relay 821 to ground at the back contact of relay 1201. Relay 823 in operating closes a circuit from ground at its inner right front contact, inner right front contact of relays 822 and 816, inner left back contact of relay 810, brush 804, conductor 444, through the windings of relays 417 and 413 in parallel to battery. The operation of relay 417 extends the conductors 445 to 450 inclusive to the group circuit. With relay 413 operated, relay 411 is held operated in a local circuit and a circuit is closed for flashing lamp 414 which will be described hereinafter.

The operation of relay 823 also closes a circuit from ground, outer right contact of relay 823, inner left contact of relay 826, left back contact of relay 827, conductor 1127, winding of relay 1105, conductor 1139 to battery at the contact of the relay corresponding to relay 1104 in the adjacent right position. This indicates that the home operator and equipment are busy with a call.

The operation of relay 417 completes a circuit from ground through the winding of relay 824, conductor 825, back contact of relay 901, conductor 902, conductors 855, and 448, contact of relay 417, brush 406, conductor 244, winding of relay 245 to battery. Relay 824 operates but the relay 245 is marginal and does not operate at this time. The operation of relay 824 closes a circuit from ground over the front contact of relay 824, winding of relay 826 to battery. Relay 826 locks over its inner right contact to ground at the front contact of relay 822. The operation of relay 826 closes a circuit from ground over its outer left contact, middle left contact of relay 817, outer left contact of relay 814, conductor 850, left normal contact of relay 1202, winding of relay 1218 to battery. A branch of this circuit extends over the back contact of relay 1237 to the winding of relay 1238. Relay 1238 operates, in turn operating relays 1240 and 1239 the purpose of which relays will be explained later.

The operation of relay 417 also closes a circuit from battery through the winding of relay 230, conductor 231, brush 402, contact of relay 417, conductor 445, conductor 830, winding of relay 829 to ground. Relay 829 operates but relay 230 being marginal does not. The operation of both relays 824 and 829 indicates to the master circuit that the trunk with which it has become associated is one incoming from an automatically operated office. Therefore with relays 826, and 829 operated, a circuit is closed for causing the association of the call indicator with the trunk, which circuit extends from ground over the outer right contact of relay 826, front contact of relay 829, right winding of relay 903 to battery. Relay 903 locks through its left winding and left front contact, conductor 906, left front contact of relay 823, outer left contact of relay 826 to ground. Relay 903 also extends its locking ground to the winding of relay 905 and battery. Relay 905 provides locking ground for the transfer relays 913, 914, etc., for the register relays of stations register 900 and also connects ground over its inner left contact to conductor 825 in shunt of the winding of relay 824, thus permitting marginal relay 245 to operate. The operation of relay 245 disconnects the tip and ring conductors from the windings of relay 218 and connects them over conductors 247 and 246, contacts of relay 417, conductors 446 and 449, conductors 856 and 857, right back contacts of relay 907, to the windings of relays 910, 909, and 908. The transfer of the conductors initiates the operation of the sender to transmit code impulses to set the indicator registers such as register 900. The operation of the relay combination, 911 and 912, the transfer relays, and the register relays is essentially the same as that described in U. S. Patent 1,464,084, granted to A. E. Lundell et al, August 7, 1923.

The transfer of the tip and ring conductors releases relay 218 and therefore removes ground from conductor 221. This in turn releases relay 837, and relays 1203 and 821. However, the release of relay 821 does not release relays 826 or 814 since these relays are locked to the front contact of relay 822, and relay 822 is held operated over the front contact of relay 823, inner right contact of relay 903, to ground at the right back contact of relay 1201, this ground also holding relay 823 operated.

The operation of relay 817 as above described initiates the operation of the relay interrupter arrangement shown in the right hand corner of Fig. 12. That is, the relay 817 closes a circuit from ground over the outer left contact of relay 826, inner left contact of relay 817, conductor 1208, winding of relay 1207, resistance 1206 to battery. Relay 1207 operates, in turn operating relay 1209. Relay 1209 in turn operates relay 1210 and relay 1210 closes ground to resistance 1206 shunting relay 1207 and causing relays 1207, 1209, 1210 to release in succession. Relays 1207 and 1210 are slow to release to measure an interval before their release permits their reoperation. Relay 1209 also closes a circuit from ground at its outer right contact, back contact of relay 1211, winding of relay 1212, right winding of relay 1211 to battery. Relay 1212 operates but relay 1211 being marginal does not. Relay 1212 closes a locking circuit for itself extending from battery through the right winding of relay 1211, winding of relay 1212, left winding of relay 1211, inner left contact of relay 1212 to ground over conductor 1208. Relay 1211 cannot operate in this circuit since the left hand winding is shunted by the energizing circuit of relay 1212. When relay 1209 releases, this shunt circuit is opened and relay 1211 also operates in the locking circuit of relay 1212. The next operation of relay 1209 closes a circuit from ground over its outer right contact, right front contact of relay 1211, right winding of relay 1211 to battery. This circuit is in shunt of the winding of relay 1212 and that relay releases, but relay 1211 is so wound that it will remain operated in this circuit. When relay 1209 next releases, the holding circuit of relay 1211 is opened and relay 1211 also releases so that on the next closure of the contact of relay 1209 the cycle of operations is repeated. Each time that relay 1209 operates, ground is connected over its left contacts to conductors 1215 and 1216. Each time that relay 1212 operates, which is half as often as the operation of relay 1209, ground is connected to conductors 1213 and 1214. Each time that relay 1211 operates, battery is connected to conductor 1217. It will be apparent that this relay combination provides interrupted ground at two rates, one twice as fast as the other, and interrupted battery at the slow rate. The operation of relay 817 which starts the relay interrupter also completes the flashing circuit for group lamp 414, which may be traced from battery through lamp 414, front contact of relay 413, conductor 467, right back contact of relay 707, conductor 460, right back contact of relay 416, conductor 441, conductor 851, outer right contact of relay 817, right back contact of relay 828, conductor 1214, to ground at the right contact of relay 1212. It is therefore apparent that lamp 414 will be intermittently lighted at the slow rate. At the same time a circuit is closed from battery through lamp 225 which is individual to the trunk of Fig. 2, conductor 224, brush 405, contact of relay 417, conductor 447, conductor 852, outer left contact of relay 818, right winding of relay 832, left back contact of relay 833, left back contact of relay 828, conductor 1213 to ground at the outer left front contact of relay 1212, thus the trunk lamp 225 is also flashed at the slow rate. The operator is therefore given a visual indication of the group and trunk over which the call is incoming. A circuit in parallel with lamp 225 extends from conductor 852 over the outer left front contact of relay 817, left winding of relay 832 to battery. The currents through the two windings of relay 832, due to its differential winding, neutralize one another and relay 832 remains unoperated.

The operation of relay 1218, above described, closes a circuit from ground over the left front contact of relay 1113, conductor 1134, inner left contact of relay 1218, to the winding of relay 1219. Relay 1219 extends its operating ground to the winding of relay 1220 and battery, while relay 1220 in turn operates relay 1221, and relay 1221 operates relay 1202. Relays 1219, 1220 and 1221 are slow to operate thus causing a measured interval to elapse between the operation of successive relays. Relay 1202 in operating opens the circuit of relay 1218 and relays 1218 and 1219 and 1220 successively release. However, relays 1202 and 1221 are held operated, the circuit for relay 1221 now extending over the left alternate contact of relay 1202 to ground over conductor 850 as previously traced, and relay 1221 holding relay 1202 operated. The operation of relay 1218 connects the secondary winding of tone coil 1222 to condensers 1225 and 1226 and over back contacts of relay 1202 to conductors 1223 and 1224. Conductors 1223 and 1224 extend over conductors 853 and 854, conductors 450 and 445, contacts of relay 417, to brushes 401 and 402, respectively. Conductor 1224 is then extended over conductor 231, winding of relay 230, and battery which circuit is ineffective at the present time since conductor 1223 is not extended beyond brush 402 in the case of a trunk incoming from a mechanical office. The operation of relay 1218 closes a circuit through the primary of tone coil 1222, inner right contact of relay 1218, right normal contact of relay 1219, to ground at the right normal contact of relay 1221. The operation of relay 1219 opens this circuit but the operation of relay 1220 closes it over the front contacts of relays 1219 and 1220 and the operation of relay 1221 again opens it. In consequence two impulses of tone are transmitted to the condensers and through them to the operator's headset 1100, by way of conductors 1227, and 1230 front contacts of relay 818, conductors 1129 and 1130, front contacts of relay 1109, and the back contacts of relay 1108. This calls the attention of the operator to the fact that a call is awaiting her attention even should she fail to observe the lighting of lamp 414 or of lamp 215.

The call indicator circuit of Fig. 9 is equipped to operate either with senders which transmit a final heavy positive pulse or with those which do not. On that account the operation of relay 914 following the reception of the impulses representing the first digit, causes the operation of relay 920. When relay 907 operates following the reception of the last digit, negatively polarized relay 908 is connected to conductors 857 and 856 in parallel with resistance 918 in the reverse direction so that it may respond to a positive pulse. If a positive pulse is received, relay 908 closes a circuit from battery through the winding of relay 919, inner left front contact of relay 907, front contact of relay 908 to ground at the right front contact of relay 905 operating relay 919 alone. Relay 919 closes a locking circuit for itself through the winding of relay 901, right front contact of relay 919, to ground at the outer right contact of relay 917, in which relay 901 operates as soon as the pulse ends. The circuit of relay 920 is opened by relay 907, and the slow release of this relay measures an interval during which the positive pulse may be received. If no pulse is received, relay 920 in closing its back contact completes a circuit from battery through the winding of relay 919, and the winding of relay 901 in series, back contact of relay 920, to ground at the outer right contact of relay 917. The operation of relay 919, applies ground for lighting certain of the indicator lamps causing the display of the called line number. The operation of relay 901 opens the circuit of relay 245 which causes the transfer of the tip and ring conductors back to the windings of relay 218 and the advance of the district selector to talking position. It also prepares a circuit from the back contact of relay 1234, conductor 922, over its left contact to conductor 836, inner left front contact of relay 818, back contact of relay 833, left winding of relay 835 to battery, preparing for the operation of the release key. In addition it closes a circuit from ground at the right contact of relay 1201, conductor 834, right front contact of relay 901, conductor 921, to winding of relay 1204, and contact of relay 1203.

When the district selector has connected the calling subscriber through to the trunk, relay 218 reoperates again grounding conductor 221 and reoperating relay 837 which in turn reoperates relays 821 and 1203. If the call indicator circuit has grounded conductor 921 at the time that relay 1203 reoperates, a circuit is closed from battery through the winding of relay 1231, outer left contact of relay 1203 to conductor 921. Relay 1231 locks over its left front contact through the winding of relay 1204 to conductor 921, but relay 1204 is inoperative since ground is connected to both terminals of its winding. The operation of relay 1231 operates the master switch peg count meter. The purpose of relay 1204 is to prevent ringing the wrong party if reselection takes place quickly after abandonment. If the call should be abandoned at this time, relay 1203 will release and remove ground from the second terminal of relay 1204 permitting that relay to operate in the locking circuit of relay 1231. With relay 1204 operated, it is impossible for relay 1203 to reoperate and hence to complete the circuit for starting the ringing of the called party as described hereinafter.

Assuming that the call is not abandoned the operator observing the called line number will close either release key 1232 or 1233 whichever is more convenient, one being located on the left and the other on the right side of the operating shelf. A circuit is thus completed over the release key, the back contact of relay 1234 and conductor 922 to the winding of relay 835 as previously traced. Relay 835 locks in a circuit from battery through its right winding and right front contact to ground at the front contact of relay 814. It also closes a circuit from ground over its outer right contact to the winding of relay 1235 and to the inner left contact of relay 1203 providing a locking circuit for that relay. In addition it extends its locking ground to the left winding of relay 1234, which relay locks through its right winding, and right front contact to the operated release key rendering the release independent of the length of time that the release key is held operated. Relay 1235 in operating closes a circuit from battery through the winding of magnet 408, conductor 451, brush 801, right back contact of relay 838, outer left contact of relay 1235 to ground. It also closes a circuit from ground over its inner left contact, front contact of relay 1203, outer right back contact of relay 810, brush 802, conductor 452, brush 403, conductor 226, winding of relay 220 to battery. A third circuit extends from ground over its inner right contact, the winding of relay 1237 to battery, and in parallel therewith over the outer left front contact of relay 1203 to the winding of relay 1201 and battery. A fourth circuit extends from ground over the outer right contact of relay 1235, winding of magnet 808 to battery.

Relay 1237 in operating opens the circuit of relay 1238 which releases, in turn releasing relays 1240 and 1239. Relays 1238 to 1240 release slowly, completing after an interval, a circuit from ground over the normal contact of relay 1238, back contact of relay 1239, front contact of relay 1237 to the winding of relay 1201. An alternate circuit for operating relay 1201 is therefore provided in case the district selector is slow in closing the talking circuit, thus delaying the reoperation of relay 1203. The operation of relay 1201 opens the circuit of relays 817 and 818, and the circuit of relay 821. Relay 818 disconnects the operator's telephone from the master circuit, opens the flashing circuit for lamp 414, the operating circuit for the relay interrupter, and the circuit of relay 823. Relay 823 in turn releases relays 1105, 417 and 413, disconnecting the group circuit from the master circuit and releasing relays 815 and 816. Relay 823 also releases relay 822 and that relay in turn releases relay 814, which finally releases relay 835. The release of relay 835 releases relay 1235 which in turn releases magnet 808 and permits the advance of the master switch to its next terminal, where it will serve a call which may exist in the corresponding group before advancing to other groups. The release of relay 1235 also advances switch 400 to the next trunk, thus definitely opening the connection between the trunk and the group circuit. The master switch is now ready to serve a call in group No. 2. Such a call would hold relay 1200 operated and reoperate relay 815 to initiate the operation of the master switch circuit. If a call is waiting in some other group, the operation of relay 815 will be delayed until the master switch has been advanced to the corresponding terminals.

Relay 220 in operating locks to the ground at the front contact of relay 218 and prepares for ringing the called subscriber. The operator tests the called line jack with the tip of the trunk plug, the test circuit extending from the sleeve of jack 227, tip of plug 228, upper back contact of relay 229, back contact of relay 230, conductor 233, back contact of relay 708, back contact of relay 711, conductor 756, front contact of relay 1110, upper right winding of the operator's repeating coil to ground. This circuit extends in parallel to half of the remaining trunks of the group. The even numbered trunks are connected to one busy test conductor such as conductor 233, while the odd numbered trunks are connected to a second busy test conductor, such as conductor 741. This is merely to decrease the load and the interference.

If the called line is idle, the operator inserts plug 228 in jack 227, completing a circuit from ground through the cut-off relay of the subscriber's line, sleeve of jack 227 and plug 228, lower winding of relay 229, to battery through lamp 225. Lamp 225 does not light since relay 229 immediately operates, closing a circuit from battery through the winding of relay 238, back contact of relays 237 and 236 in parallel with the winding of relay 237, lower front contact of relay 229, outer right contact of relay 220, lower winding of relay 229 to ground at the sleeve of the line, which is in shunt of the lamp. Relay 238, operated, closes a circuit from source of ringing current 239, winding of relay 236, lower front contact of relay 238, ring of plug 228 and jack 227, through the ringer at the subscriber's substation, over the tip of jack 227 and plug 228, upper front contact of relay 229, upper front contact of relay 238, to ground. The subscriber is signaled in this circuit. Relay 236 does not respond to ringing current.

When the called subscriber answers, the direct current circuit provided causes the operation of relay 236 which opens the shunt around the relay 237. Relay 237 then operates, locking to battery at its own front contact and shunting relay 238 which releases to connect the tip and ring of the subscriber's line through to the right windings of repeating coils 219. Relay 240 now operates closing a circuit from ground over its front contact, outer left front contact or relay 220, winding of relay 248 to battery. Relay 248 reverses the connection of the tip and ring conductors to the district selector for supervisory purposes. Relay 220 remains locked to relay 218 as long as the calling subscriber keeps his receiver off the switchhook.

When the called subscriber hangs up, relay 240 releases in turn releasing relay 248 and restoring the direction of current in the trunk. When the calling subscriber disconnects, relays 218 and 220 release and the shunt around lamp 225 is opened permitting that lamp to light in series with the lower winding or relay 229 as long as the plug 228 remains in the jack. If the operator should inadvertently remove the plug from the jack while conversation was in progress, lamp 225 would light in a circuit from battery through the lamp, outer right front contact of relay 220, lower back contact and upper winding of relay 229 to ground.

If the trunk should be reselected before the plug is removed from the jack, lamp 225 is still lighted as above described in series with the sleeve relay 229. The operation of the group circuit and the master switch is the same as described above. However, when relay 817 operates to initiate the operation of the interrupter for the purpose of flashing lamps 414 and 225, a circuit is closed from battery through the left winding of relay 832, outer left contact of relay 817, conductor 852, and thence over conductor 447, contact of relay 417, brush 405, conductor 224, to the winding of relay 229. Ground is now connected to this winding and conductor 224 from the sleeve of jack 227. At this time no current flows through the right winding of relay 832 since one side of this winding extends to ground over conductor 852 and the other to ground over the back contact of relay 833, as previously traced. The currents through relay 832 are unbalanced and relay 832 therefore operates closing a circuit from ground at its front contact through the widing of relay 833 to battery. Relay 833 in operating transfers the winding of relay 832 from ground over conductor 1213 to battery over the back contact of relay 827 and the left front contact of relay 1211. Each operation of relay 1211 therefore connects battery through the right winding of relay 832 to conductor 224 in shunt of lamp 225 extinguishing that lamp intermittently to give a flashing signal to the operator. The direction of this intermittent current through the right winding of relay 832 aids in holding the relay operated. It is impossible for the operator to disconnect the position equipment from the trunk without first removing the plug from the jack, since the operation of relay 833 opens the circuit from the release key to relay 835. The removal of the plug from the jack causes the release of relays 832 and 833 permitting the operator to release her position equipment and to complete the call in the usual manner. Since the relay 835 cannot be operated as long as the plug is in the jack, relay 220 cannot be operated and it is impossible to ring the wrong subscriber.

If the sleeve of a trunk should become grounded, relays 832 and 833 cannot be released by the removal of the plug from a line jack, and the release keys are ineffective. In this case the emergency release key 1242 may be operated. This key closes a circuit from ground at the right contact of relay 814, right back contact of relay 1241, contact of key 1242, left back contact of relay 1241, right winding of relay 841 to battery. Relay 841 operates relay 835 which performs its releasing functions. Relay 841 locks to the contact of relay 814 and operates relay 1241 which locks as long as key 1242 is held operated.

If neither the release key 1232 or 1233, nor the emergency release key 1242 will release the position equipment, the emergency key 890 is operated. Key 890 closes obvious circuits for relays 838 and 810. Relay 838 in turn closes a circuit for relay 811. Relays 811, 838 and 810, prevent the association of the master switch with a group circuit, and connect the group circuits to the adjacent master switches. To this end relay 811 closes a circuit from ground at its left front contact, conductor 454, right winding of relay 415 to battery. Trunks of group No. 1 will therefore summon the master switch of position A at all times. Relay 811 also closes a circuit from ground at its right front contact, conductor 554, right winding of relay 515 to battery so that trunks of group No. 2 will summon the master switch of the right adjacent position. A similar circuit is closed over the outer right contact of relay 810 to conductor 891 which controls the team relay of group No. 3. Relay 811 also opens the circuits of relays 1200 and 815 so that the master switch cannot be operated.

Relay 810 removes ground from key 701, relay 815 from key 702 and relay 838 from key 703 rendering these keys ineffective. Relay 811 also disconnects brush 805 from the circuits controlled thereover, while relay 810 disconnects brushes 804, 803 and 802 and relay 838 disconnects brush 801. Relay 810 closes a circuit from battery through the windings of relays 1106 and 1107, conductors 753, and 721, to ground at the left front contact of relay 810. Relay 838 also closes a circuit over its left front contact for operating the relays corresponding to relays 1106 and 1107 in the right adjacent position, thus completely isolating the position.

*Connection from manual office-teamwork*

The initiation of a call by the subscriber at substation 100 causes the operation of line relay 101 to light lamp 102. The operator whose headset is shown at 112 inserts plug 103 in jack 104, completing the circuit of cutoff relay 105 through resistance 106 and lamp 107. Since the subscriber's receiver is off the switchhook, a circuit is closed from battery through lower left winding of repeating coil 108, winding of supervisory relay 109, ring of plug 103 and jack 104, through the subscriber's substation 100, tip of jack 104 and plug 103, upper left winding of repeating coil 108 to ground. Relay 109 operates connecting battery through resistance 110 in shunt of lamp 107 to prevent its lighting. The operator then closes talking key 111 which permits her to inquire of the subscriber the desired line number. She then inserts the calling plug 113 in the jack 114 of an idle outgoing trunk, closing a circuit from ground over the sleeves of jack 114 and plug 113, resistance 116, lamp 115 to battery, lighting lamp 115. A circuit is also closed from ground through the upper right winding of repeating coil 108, normal contact of key 117, tips of plug 113 and jack 114, upper left winding of repeating coil 119, left winding of relay 118 to battery. Relay 118 operates connecting ground over the back contact of relay 120, to conductor 121, and through resistance 122 to conductor 123. The grounding of these two conductors causes group switch 300 to operate in search of the trunk as described for switch 400. Relay 310 which operates from ground on conductor 123 closes a circuit from ground at its left front contact, conductor 366, back contact of relay 604, conductor 365, back contact of relay 315, conductor 340, to the master switch shown in the lower left corner of Fig. 10.

Assuming that the operator at position A is busy completing a connection in some other group, the grounding of conductor 340 will be temporarily ineffective. Since the operator is busy, a circuit will be closed from battery over the front contact of relay 1104, conductor 1039, winding of relay 1005, conductor 1027 and thence to ground in the master switch circuit, the circuit being completed in the same manner as was the circuit for relay 1105 in the previous case. Therefore, as soon as switch 300 has connected with the calling trunk, the operation of relays 311 and 312 closes a circuit from battery over the inner right front contact of relay 312, left winding of relay 315, left normal contact of relay 313, back contact of relay 309, conductors 368 and 1041, outer left contact of relay 1101, conductor 1040, to ground at the left front contact of relay 1005. Relay 315 therefore operates in turn operating relay 316. Relay 315 transfers conductor 365 from connection with conductor 340 to connection with conductor 320. Conductor 320 extends in parallel through resistance 842, back contact of relay 811, to the winding of relay 1200 and to a terminal of brush 806. Therefore since the home operator at position A is busy, the team operator, that is the operator at position B, will be summoned to handle the call incoming on the trunk of Fig. 1 which appears in group No. 3 of position A.

The operation of the master switch is in general the same as previously described. However, since this call is being handled by the team operator, as indicated by the operation of relays 315 and 316, a circuit is closed from battery through the windings of relays 827 and 828 in parallel, conductors 850 and 323, inner left contact of relay 316, conductor 322, brush 805, right back contact of relay 811, front contact of relay 816 to ground at the back contact of relay 1201. The operation of relay 828 transfers the circuits for lighting lamps 314, and 125, from slow interrupting relay 1212 to fast interrupting relay 1209, causing these lamps to flicker as a signal to the adjacent operator.

Relay 827 in operating opens the circuit of relay 1105. Therefore, any call incoming to position B will be unable to summon a team operator as long as the operator at that position is busy with a team call. Relay 827 also opens the source of interrupted battery. Since the master switch at position B is being employed, the team relay 318 will be operated instead of the home relay 317, the circuit for relays 313 and 318 extending in parallel through the windings of the relays, over conductor 324, brush 804, left back contact of relay 810, inner right contact of relays 816, 822 and 823 to ground.

With relay 313 operated, a locking circuit is closed for relay 315 extending from battery at the front contact of rleay 312, left winding of relay 315, alternate contact of relay 313, to ground at the outer left contact of relay 315, preventing the release of relay 315 should the home operator become free before this call is completed.

With relay 318 operated, a circuit is closed for relay 824 from ground through the winding of that relay, conductor 825, back contact of relay 901, conductors 902 and 328, front contact of relay 318, brush 306, conductor 131, to battery through the winding of relay 130. As in the previous case relay 130 does not operate at this time, but relay 824 does. Since the trunk is incoming from a manual office, the circuit of relay 829 extends over conductors 830 and 325, contact of relay 318, brush 302, conductor 135, upper right winding of repeating coil 119 to ground. Therefore relay 829 is not operated and relay 824 is operated alone. Since relay 829 is not operated, the relay call indicator circuit is not connected with the trunk and release keys 1232 and 1233 do not have to await the operation of the indicator to become effective.

The operation also differs, in that the tone circuit which extends from the secondary winding of tone coil 1222 and was previously traced to brushes 402 and 401, now extends to the corresponding brushes 302 and 301 of switch 300. The circuit extends from brush 302 over conductor 135, and the upper right winding of repeating coil 119 to ground, and from brush 301 over conductor 134, winding of relay 140, lower right winding of repeating coil 119 to battery. Therefore, the impulses of tone are conducted to the repeating coil 119 whence they are transmitted to the operator's telephone 112, and the operator at the originating office is informed that she may transmit the number to the distant operator.

Since relay 828 is operated indicating that the master switch is operating on a team work basis, the operation of relay 1221 during the transmission of these tones closes a circuit from ground over the outer right contact of relay 826, back contact of relay 829, front contact of relay 1221, inner right contact of relay 828, to the winding of relay 824, shunting that relay and reducing the resistance in series with relay 130, so that relay 130 operates. Relay 130 locks to the inner right contact of relay 120. It also transfers the busy test circuit from position A to position B so that the test circuit may now be traced from the tip of plug 128, upper back contact of relay 129, front contact 130, conductor 132, back contact of relay 605, conductor 633, conductor 756, outer left contact of relay 1110, upper right winding of the repeating coil of operator's telephone 1100 to ground.

If the trunk of Fig. 1 should be reselected before plug 128 is removed from the jack 127, and the home operator be still engaged, the ground connected to conductor 124 from jack 127 is connected over a circuit over brush 305, winding of relay 309 to battery at the middle right contact of relay 312. Relay 309 in operating opens the circuit of relay 315. Therefore the call will wait until the home master switch reaches this group. Relays 409 and 509 are similarly operated when a trunk in their corresponding groups is reselected before the plug is removed from the jack. It is therefore apparent that only the home operator is signaled under this condition.

The effect of the operation of the release key and the release of the position equipment is substantially as described in connection with Fig. 2. The operation of supervisory relay 140 due to the response of the called subscriber completes a circuit through the right winding of relay 118, and the winding of relay 141 of the operator's cord, thus extinguishing the lamp 115 as a signal that the connection has been completed.

A call incoming in the group served by switch 400, that is group No. 1 of position B will, if the position B operator is busy, and the position A operator not busy, cause the position A master switch to serve the call. Relay 415 is operated in the same manner as described for relay 315 to mark the group in the position A master switch. If the position A operator is also busy the call merely holds closed the circuit of the relay similar to relay 1200 of the position A switch. If the position B operator becomes free first, the release of relay 1105 opens the circuit of relay 415, restoring the circuit for summoning the position B master switch. If group No. 1 is not the next group to be served by switch 800 and a call is waiting on an intervening group, relay 1105 will be reoperated, reoperating relay 415 to make another attempt to summon the master switch of position A on a teamwork basis.

With keys 601, 701, etc., operated the trunks of group No. 2 of any position can be served only by the home operator. For example, when relay 512 is operated in response to an incoming call, a circuit is prepared for the teamwork relay 515 from battery over the inner right contact of relay 512, through the left winding of relay 515, inner left back contact of relay 513 and the back contact of relay 509 to conductor 568. Conductor 568 extends to the inner left contact of relay 710 which is open and the inner left contact of relay 1103 which is also open. Therefore relay 515 cannot operate and cannot summon either adjacent master switch.

If the operator at position B should vacate her position without releasing key 701, relays 1150, 1109, 1110 and 1113 are released. A call incoming at this position would progress as above described until relay 814 is operated. The operation of relay 814 closes a circuit from battery through the winding of relay 1218, normal contact of relay 1202, conductor 850, outer left front contact of relay 814 to ground at the left back contact of relay 1113. Relay 1218 closes a circuit from ground at the right back contact of relay 1113 to the night alarm circuit, warning that a call is incoming on a vacant position. With relay 1113 released, the circuit for relay 1219 is open and relay 1218 holds the tone connected to the trunk. The calling operator hearing this may then release this trunk and complete the call over trunk appearing at a different position. For a call incoming from a mechanical office the signal can be silenced only by the operation of relay 1113 by the insertion of a telephone headset at that position.

*Use of other splitting keys*

Suppose that keys 602, and 702, and similar keys in adjacent positions are operated. The operation of key 702 closes a circuit from battery through the winding of relay 1102, conductor 754, closed contact of key 702, normal contacts of keys 701 and 603, conductor 638 to ground at the outer right back contact of relay 811. A similar circuit is closed for relay 1002 over the closed contact of key 602. With relay 1102 operated a circuit is closed from battery through the windings of relays 1106 and 1107, conductor 753, back contact of relay 614, contact 630, back contact of relay 713, conductor 757, to ground at the inner left contact of relay 1102. Relay 1106 operates relay 1104 as before. Similarly relay 1002 operates relays 1006 and 1007 and in turn relay 1004. In addition relay 1102 closes a circuit from ground over its middle left front contact, conductor 469, normal contact of relay 413, conductor 462, to the winding of relay 707 and battery. Relay 707 closes a circuit from battery through the windings of relays 708 and 709 in parallel to ground at its outer right contact. Since the circuit includes the normal contact of the group relay 413, it is ineffective as long as a call is being served, but becomes effective as soon as relay 413 releases. Whenever relay 413 operates, its make-before-break contact transfers the circuit of relay 707 from the control of relay 1102, to conductor 463 and ground at the front contact of relay 708 so that the release of key 702 cannot affect a call being handled at the time. Similarly relay 607 is operated and in turn operates relays 608 and 609.

With relays 707, 708 and 709 operated, it will be noted that the circuit for summoning the master switch which is closed at the right contact of relay 410, extends over conductor 466, outer left front contact of relay 707, conductor 464, outer right back contact of relay 415, and conductor 420 to the master switch of position A, that is, the trunks of the group No. 1 now summon the master switch of position A as the home switch. The circuit for operating team relay 415 extends over the front contact of relay 707 to the contact of relay 1005 instead of to the contact of relay 1105. With relay 415 operated, indicating that the position A operator is busy, the circuit for summoning the master switch will be transferred back to conductor 440 and the master switch of position B.

The circuit for summoning the master switch closed by relay 510 of group No. 2, extends as before over conductor 566, left back contact of relay 710, conductor 565, inner right back contact of relay 515, conductor 540 to brush 806 and the winding of relay 1200 of the master switch at position B. With this splitting arrangement no circuit is provided for relay 515 and hence the trunks of group No. 2 can only be served by the operator at position B.

The operation of relays 707, etc., also alter the busy test leads so that the home busy test lead which extends over the back contact of relay 230, for example, and previously extended to the operator's telephone 1100, now extends over conductor 233, the front contact of relay 708, conductors 623 and 656 to the operator's telephone 1000, while the team busy lead from the front contact of relay 230, over conductor 232, extends over the inner front contact of relay 708, back contact of relay 711 to conductor 756 and the operator's telephone 1100. It is therefore apparent that the operation of key 702, transfers the trunks of group No. 1 of position B to the home control of the operator at position A, transferring likewise the signaling and busy test conditions.

Suppose, however, that keys 603 and 703 are operated. The operation of key 703 closes a circuit from battery through the winding of relay 1103, conductor 755, operated contact of key 703, normal contacts of keys 702 and 701, conductor 743 to ground at the back contact of relay 838. Similarly relay 1003 is operated. With relay 1003 operated, a circuit is closed from ground at the outer left contact of relay 1003, conductor 369, normal contact of relay 313, conductor 362, winding of relay 604 to battery. Similarly the operation of relay 1103 causes the operation of relay 704. Relay 1003 closes a circuit for relays 1106 and 1107 extending over conductors 753 and 631, back contact of relay 614, conductor 630, back contact of relay 713, conductors 757 and 1042 to ground at the inner right contact of relay 1003. Relay 1104 is operated as before. Similarly the corresponding relay of the left adjacent position causes the operation of relays 1006, 1007 and 1004. With these keys operated, group No. 3 of each position is associated with the next right position. For example, the circuit for summoning the master switch, closed at the left front contact of relay 310, now extends over conductor 366, left front contact of relay 604, conductor 364, back contact of relay 315, conductor 320, to brush 806 and the winding of relay 1200. With relay 315 operated, it extends over conductor 340 to the master switch at position A. The relays 604, 605 and 606 perform similar functions in the transfer of the circuit of relay 315 and the busy test leads to those described for relays 607, 608 and 609. Group No. 2 trunks with this arrangement are served on a teamwork basis by the right adjacent position. The circuit of teamwork relay 515 which was traced above to conductor 568 is now extended over the inner left front contact of relay 1103 to the left contact of relay 1105. With relay 515 operated, the circuit for summoning the master switch extends to conductor 520 leading to the right adjacent master switch.

If an operator's position were formed by the operation of key 601 alone, positions A, B and a position to the left thereof forming one division, relays 1006, 1007 and 1004 would be operated as previously described. The operator may be located at either position A or position B. Since no keys are operated in position B, relays 1106, 1107 and 1104 are not operated and assuming that the operator is located at position A, her telephone 1000 will be associated with the piston B master switch over the back contacts of relay 1008, front contacts of relay 1009, back contacts of relay 1107, and conductors 1129 and 1130. Under this condition there will be no teamwork between positions A and B since one operator is serving them. That this is true may be seen from the fact that the circuit prepared for relay 315 and extending over the back contacts of relays 313 and 309 to conductor 368 is open at the contact of relay 1003 and at the contact of relay 1101. Similarly the circuit of relay 415 extending to conductor 468 is open at the contacts of relays 707 and 1101.

Suppose an operator's division were formed by operating key 702 and other keys to the right and left more than one position away. The operation of key 702 causes the operation of relays 1102, 1104, 1106 and 1107. Relays 1106 and 1107 operate in a circuit from battery through their windings in parallel, conductors 753, 631, back contact of relay 614 conductor 630, back contact of relay 713, conductor 757, inner left front contact of relay 1102 to ground. Relay 1104 is operated in turn. Under this arrangement no operator may use position B. Should an operator attempt to use the position, operating relay 1109 by the connection of her headset thereto, a circuit will be closed from ground at the outer left contact of relay 1109, conductor 1137, over the back contact of the relay corresponding to relay 1102, in the next right position, conductor 1138, outer right contact of relay 1102, winding of relay 1108 to battery. Relay 1108 connects a tone to the headset to warn the operator not to use the position. Relay 1102 in combination with relay 1110 will also operate the relays corresponding to relays 1106, 1107 and 1104 in the adjacent right position, thus cutting this position away from the adjacent positions and preventing the operation of relay 1113.

Under the assumed conditions relays 704, 707 and 710 are operated. The circuit for relay 707 may be traced from battery through the winding of that relay, conductor 462, normal contact of relay 413, conductors 469 and 750 outer left front contact of relay 1102 to ground. The circuit for operating relay 710 extends over conductor 562, normal contact of relay 513, conductor 569, outer right back contact of relay 1110 to ground at the outer left front contact of relay 1102. The circuit for relay 704 similarly extends over the back contact of relay 1110. Relays 704, 707 and 710 in turn cause the operation of relays 705, 706, 708, 709, 711 and 712. Relay 708 transfers home busy test lead for group No. 1, namely conductor 233, from operator's telephone 1100 to conductor 623, leading to the operator at position A, assuming an operator is located at that position, and in combination with relay 711 connects team busy test lead 232 to conductor 733, leading to the operator's headset at the adjacent right position. Relay 711 connects the home busy test lead for group No. 2, namely, conductor 782 to conductor 733 and in combination with relay 708 connects team lead 783 to conductor 623. Home busy lead 780 for group No. 3 is extended to conductor 733 and team busy lead 781 to conductor 623.

Group No. 1 of position B will now normally summon the master switch of position A while group Nos. 2 and 3 will normally summon the master switch of the next right position.

If the operator of the next right position is busy so that relay 515 is operated when a call is initiated in group No. 2, relay 516 is also operated. The circuit for summoning the master switch then extends from ground at the right front contact of relay 510, conductor 566, outer left front contact of relay 710, conductor 564, inner right front contact of relay 515, conductor 540 to brush 806, summoning switch 800. Since relay 516 is operated relay 828 will be operated giving team signalling for the purpose of signalling the operator at position A. Since relay 712 is operated, as above mentioned the shunts are removed from the windings of relays 713 and 714. When the circuit for relays 828 and 827 is now established it extends through the winding of relay 713 operating that relay. The operation of relay 713 opens the circuit of relays 1106 and 1107 which release, releasing relay 1104. Operator's telephone 1000 is now extended to the master switch of position B over back contacts of relay 1008, front contacts of relay 1009 and the back contacts of relay 1107 to conductors 1129 and 1130. Likewise relay 1113 is operated over the left back contact of relay 1106 from ground at the contact of relay 1010, to cut off the warning tone.

A call in group No. 1 with the operator of position A busy, would operate relay 714 in series with relays 827 and 828. Relay 714 opens the circuits of relays like relays 1106 and 1107 in the next right position permitting the connection of the operator at that position over conductors 1145 and 1146 to the position B master switch, and the operation of relay 1113 over conductor 1147 from ground at the right position.

Assume that an operator is serving both positions A and B, key 601 and corresponding key in the position to the right of position B being operated. Relays 1006, 1007 and 1004 will operate as previously described together with the corresponding relays in the position to the right of position B. If a call is now initiated in group No. 1 of position B, master switch 800 will be advanced to position 1, 8 or 15. The operation of relay 1200 will cause the operation of relays 1111 and 1112 as above described. When the release key is operated, switch 800 is advanced to position 2, 9 or 16. The master switch is so wired that in positions 2, 9 and 16 a call from group No. 2 may be served; in positions 3, 10 and 17 from group No. 3; in positions 4, 11, and 18 from group No. 3 of the left adjacent position; in positions 5, 12 and 19 from group No. 1 of the right adjacent position; and in positions 6, 13 and 20 from group No. 2 of the right adjacent position. Assuming that a second call in group No. 1 is the only waiting call at position B, relay 1200 will be held operated, holding relay 1111 operated, and switch 800 is advanced over positions 2, 3, 4, 5, and 6 to position 7. In this position a circuit is closed from battery through the winding of relay 815, inner left back contact of relay 811, the 7th, 14th or 21st terminal of brush 806, winding of relay 1251, left back contact of relay 814, to ground at the back contact of relay 815. Relay 815 being marginal is not operated in this circuit. Relay 1251 operates, opening the circuit of relay 807 which controls the advance of the master switch, and extends its operating ground to the winding of relay 1250 which also operates. Relay 1250 opens the circuit of relay 1111. Relay 1111 releases in turn releasing relay 1112. Should a call be waiting attention in one of the groups of position A at this time, ground will be connected to conductor 1031, over a similar circuit to that traced to conductor 1131 hereinbefore described, which now extends through the winding of relay 1011, left normal contact of relay 1107, back contact of relay 1112, conductor 1144 to battery, in the position to the right of position B. Relay 1011 operates in turn operating relay 1012, and the master switch circuit of position A functions to permit the operator to serve the call waiting in that position. When the relay of position A corresponding to relay 1200 is released, or that master switch advances to position 7, 14 or 21, relay 1011 releases permitting relay 1112 to operate if a call is waiting position B. A substitute circuit for relay 807 is closed when relays 1250 and 1251 operate which may be traced from battery through the winding of relay 807, back contact of magnet 808, front contact of relay 1250, front contact of relay 1251, back contact of relay 814, to ground at the back contact of relay 815. This circuit advances switch 800 to its next operative position, 1, 8 or 15, releasing relay 1251. Relay 1250 being slow to release is held operated in a circuit over the front contact of relay 1200, back contact of relay 1251, to ground at the back contact of relay 815. With relay 1251 released, the operating circuit of relay 807 is restored, to the control of relay 1200. However since it was assumed that a call is waiting in group No. 1 relay 815 is operated as soon as switch 800 reaches position 1, 8 or 14, releasing relay 1250. The release of relay 1250 again connects ground to conductor 1131, operating relay 1111. When relay 1011 releases relay 1112 can operate, removing battery from relay 1011 so that it cannot reoperate. The positive advance of the master switch following each call, and the operations just described insure that the attention of the operator will be distributed over all groups of trunks which she may be serving.

It will be noted that with no keys operated relay 1112 in operating opens the circuit of relay 1011. Similarly relay 1012 disconnects battery from the relay corresponding to relay 1011 in the adjacent left position. When a large number of positions are grouped before an operator the master switch of each position may connect ground to one side of the corresponding relay 1011, 1111, etc., but the operation of a relay such as relay 1112 or 1012 prevents the completion of the circuit of all relays 1011, 1111, etc., to the left in the chain, while all such relays to the right may be operated in parallel from the battery at the right end of the division. When a relay, for example relay 1011 releases, the nearest relay, such as relay 1112, to the right for which a circuit has been prepared, is operated and the corresponding master switch functions. Relays 1012 and 1112 being slow to release do not restore the circuit to the left until it has been reopened at the right relay. When the relay like relay 1112 at the right end of the chain has operated and released, all relays like relays 1011 and 1111 may operate. However, the operation of the furthest left relay like relay 1012 or 1112 prevents the operation of any other similar relay and the progressive serving of calls is repeated.

What is claimed is:

1. In a trunking system, operators' positions, trunk circuits incoming to said positions, a switching device at each of said positions, and means automatically operable in response to the seizure of a trunk at its distant end for associating a switching device in any one of a plurality of positions with said trunk.

2. In a trunking system, operators' positions, trunk circuits incoming to said positions, a switching device at each of said positions, and means automatically operable in response to the seizure of a trunk at its distant end for causing the switching device in any one of a plurality of positions to associate itself with said trunk.

3. In a telephone system including a plurality of trunk operators' positions, means for extending calls to said operators' positions, and automatic switching means in each of said operators' positions operable when a call is extended to said position for causing said call to be handled at any position not busy.

4. In a telephone system including a plurality of trunk operators' positions, a switching device in each position, means for extending calls to said switching devices, and means in each switching device for determining whether a call shall be handled at the position in which it is incoming or at another of said plurality of positions.

5. In a trunking system, operators' positions, trunk circuits incoming to each position, a switching device in each position, means automatically operable responsive to the seizure of one of said trunks at its distant end to cause the association of said trunk with the switching device of the position at which said trunk is incoming, and means effective when said switching device is associated with another trunk to cause the automatic association of the switching device of an adjacent position with said trunk.

6. In a trunking system, operators' positions, trunk circuits incoming to said positions, signaling apparatus at said positions, a switching device at each of said positions, means automatically operable in response to the seizure of a trunk at its distant end for associating a switching device in any one of a plurality of positions with said trunk, and means in said switching device for operating said signaling apparatus in a distinctive manner in response to said association in accordance with which of said switching devices is associated with said trunk.

7. In a trunking system, operators' positions, trunk circuits incoming to said positions, a signal for each trunk, a switching device in each of said positions, means automatically operable in response to the seizure of a trunk at its distant end for associating a switching device in any one of a plurality of positions with said trunk, and means in said switching device responsive to said association for operating the signal of said trunk in a distinctive manner to attract the attention of the operator whose switching device has been associated with the trunk and for controlling the association of said particular operator's telephone headset with said trunk.

8. In a trunking system, operators' positions, trunk circuits incoming to said positions, a lamp individual to each trunk, a switching device at each of said positions, means automatically operable in response to the seizure of a trunk at its distant end for associating a switching device in any one of a plurality of positions with said trunk, and means in said switching device for intermittently lighting said lamp at a rate characteristic of the switching device associated with the trunk.

9. In a trunking system, an operator's position, trunk circuits incoming to said position from a manually operated exchange, trunk circuits incoming to said position from an automatically operated exchange, a switching device at said position, means automatically operable in response to the seizure of a trunk at either said manual or said automatic exchange for associating said switching device with said trunk, and means in said switching device for discriminating between trunk circuits incoming from said manually operated exchange and those incoming from said automatically operated exchange.

10. In a trunking system, an operator's position, trunk circuits incoming to said position from a manually operated exchange, trunk circuits incoming to said position from an automatically operated exchange, a switching device at said position, means automatically operable in response to the seizure of a trunk at either said manual or said automatic exchange for associating said switching device with said trunk, means in said switching device responsive to said association in accordance with the nature of the exchange from which said trunk is incoming for controlling the association of apparatus with said trunk, and means to operate said apparatus to convey information to an operator for completing a telephone connection.

11. In a trunking system, an operator's position, trunk circuits incoming to said position from a manually operated exchange, trunk circuits incoming to said position from an automatically operated exchange, a switching device at said position, means automatically operable in response to the seizure of a trunk at either said manual or said automatic exchange for associating said switching device with said trunk, a call indicator at said position operable from said automatically operated exchange, and means responsive only to the association of said switching device with a trunk from an automatically operated exchange to connect said indicator with said trunk.

12. In a trunking system, operators' positions, trunk circuits incoming to said positions from manually operated exchanges, trunk circuits incoming to said positions from automatically operated exchanges, signaling apparatus at said positions for each trunk, a switching device at each of said positions, means automatically operable in response to the seizure of a trunk at either said manual or said automatic exchange for associating a switching device in one of a plurality of said positions with said trunk, means in said switching device for operating said signaling apparatus in a distinctive manner in response to said association in accordance with the switching device associated with said trunk, means in said switching device responsive to said association for controlling the association of apparatus with said trunk, and means to operate said apparatus to convey information to an operator for completing a telephone connection.

13. In a trunking system, operators' positions, trunk circuits incoming to said positions from an automatically operated exchange, a switching device at each of said positions, means automatically operable in response to the seizure of a trunk at its distant end for associating a switching device in one of a plurality of positions with said trunk, an indicator at each of said positions for visually displaying the number of a wanted subscriber's station, and means in said switching device responsive to said association for controlling the association of the indicator of the position with said trunk, said indicator being operable over said trunk conductors.

14. In a trunking system, operators' positions, lines, trunk circuits incoming from automatically operated offices to said positions for completing telephone connections to said lines, a signal individual to each trunk, means automatically operable in response to the seizure of a trunk at its distant end for operating the signal individual to said trunk to notify an operator at any one of a plurality of said positions to complete a connection by means of said trunk, said signal being operated in a distinctive manner in accordance with the operator to be notified, an indicator for each operator's position for visually displaying a line designation, means for operating the indicator associated with the position of the operator signalled for displaying the designation of the line to which said connection should be completed, and means for operating said signal for supervising said connection.

15. In a trunking system, operators' positions, a plurality of groups of trunk circuits incoming to each position, a switching device in each position, a key at each position, means responsive to the seizure of any one of said trunks at the distant end to cause the association of said trunk with the switching device of the position to which said trunk is incoming, and means responsive to the operation of one of said keys and to the seizure of a trunk in a particular one of said groups of trunks to cause the association of said trunk with the switching device at any one of a plurality of positions.

16. In a trunking system, operators' positions, a plurality of groups of trunk circuits incoming to each position, a switching device in each position, a key at each position, means responsive to the seizure of any one of said trunks at the distant end to cause the association of said trunk with the switching device of the position to which said trunk is incoming and means responsive to the operation of one of said keys and to the seizure of a trunk in a particular one of said groups of trunks to cause the association of said trunk either with the switching device at the position in which said trunk is incoming, or with the switching device of an adjacent position.

17. In a trunking system, operators' positions, a plurality of groups of trunk circuits incoming to each position, a group switching device common to each group of trunks, a master switching device in each position, means responsive to the seizure of one of said trunks to cause the association of the corresponding group switching device with said trunk, means controlled by said group switching device to cause a master switching device to associate itself with said trunk through said group switching device, a plurality of keys at each position, and means controlled by said keys to determine which of a plurality of master switching devices said group switching device shall be effective to control.

18. In a trunking system, operators' positions, a plurality of groups of trunks incoming to each position, a group switching device common to each group of trunks, a master switching device at each position, means normally responsive to the seizure of a trunk at the distant end to cause the association of the group switching device with said trunk and the master switching device of the position with said trunk, a plurality of keys at each position, and means responsive to the operation of said keys to render the seizure of a trunk effective to cause the association of any one of a plurality of master switching devices with said trunk.

19. In a trunking system, operators' positions, a plurality of groups of trunks incoming to each position, a group switching device common to each group of trunks, a master switching device at each position, means normally responsive to the seizure of a trunk at the distant end to cause the association of a group switching device with said trunk and the master switching device of the position with said trunk, a plurality of keys at each position, means responsive to the operation of said keys to render the seizure of a trunk effective to cause the association of any one of a plurality of said master switches with said trunk, and means responsive to the operation of certain of said keys to render the seizure of said trunk normally effective to cause the association of the master switching device of an adjacent position with said trunk and effective if said master switching device is associated with a trunk of another group to cause the association of the master switching device of the position with said trunk.

20. In a trunking system, operators' positions, a plurality of groups of trunks incoming to each position, a signal associated with each trunk, a group switching device common to each group of trunks, a master switching device at each position, means normally responsive to the seizure of a trunk at the distant end to cause the association of a group switching device with said trunk and the master switching device of the position with said trunk, a key at each position, means responsive to the operation of said key to render the seizure of the trunk effective if the master switch of the position is already associated with a trunk in another group to cause the association of the master switch of an adjacent position with said trunk, and means to cause the distinctive operation of said signal in accordance with the master switching device associated with said trunk.

21. In a trunking system, operators' positions, a plurality of groups of trunks incoming to each position, a signal associated with each trunk, a group switching device common to each group of trunks, a master switching device at each position, means normally responsive to the seizure of a trunk at the distant end to cause the association of a group switching device with said trunk and the master switching device of the position with said trunk, means controlled by said master switching device to operate said signal in one manner, a plurality of keys at each position, means responsive to the operation of each of said keys to render the seizure of a trunk in certain groups effective if the master switch of the position is associated with a trunk in another group to cause the association of the master switching device of an adjacent position with said trunk, means controlled by said adjacent master switching device to operate said signal in a different manner, means responsive to the operation of certain of said keys to render the seizure of said trunk normally effective to cause the association of the master switching device of an adjacent position with said trunk, and effective if said master switching device is associated with a trunk in another group to cause the association of the master switching device of the position with said trunk, and means also controlled by said certain keys to reverse the manner of operating said signal.

22. In a trunking system, operator's positions, a plurality of groups of trunks incoming to each position, a group switching device common to each group of trunks, a master switching device at each position, means normally responsive to the seizure of a trunk at the distant end to cause the association of the corresponding group switching device and master switching device with said trunk, a key at each position, and means responsive to the operation of said key at one position to render the seizure of any trunk incoming to said position effective to cause the association of an adjacent master switch with said trunk.

23. In a trunking system, operators' positions, a plurality of groups of trunks incoming to each position, a group switching device common to each group of trunks, a master switching device at each position, means normally responsive to the seizure of a trunk at the distant end to cause the association of the corresponding group switching device and master switching device with said trunk, a key at each position, means responsive to the operation of said key at one position to render the seizure of any trunk incoming to said position effective to cause the association of an adjacent master switch with said trunk, and means effective if said adjacent master switch is associated with a trunk at the adjacent position to cause the association of the position master switch with said trunk.

24. In a trunking system, operators' positions, a plurality of groups of trunks incoming to each position, a group switching device common to each group of trunks, a master switching device at each position, means normally responsive to the seizure of a trunk at the distant end to cause the association of the corresponding group switching device and master switching device with said trunk, an operator's telephone, means to associate said telephone with any one of said positions, a key at each position, means responsive to the operation of said key at one position to render the association of an operator's telephone with said position ineffective, means also responsive to the operation of said key to render the seizure of any trunk at said position effective to cause the association of an adjacent master switch and the connection of the corresponding operator's telephone with said trunk, and means effective if said adjacent master switch is associated with another trunk to cause the association of the position master switch with said trunk and the association of the other adjacent operator's telephone with said trunk.

25. In a telephone system, operators' positions, outgoing lines, a plurality of groups of trunks incoming at each position, a group switching device common to each group of trunks, a master switching device at each position, an operator's telephone common to a plurality of positions, means responsive to the seizure of a trunk to cause the association of the corresponding group switching device with said trunk and the association of the master switching device with said group switching device, means controlled by said master switching device and said group switching device to associate said operator's telephone with said trunk, a key in each master switching device, means effective only if said key has been operated to complete a connection to one of said outgoing lines, and means responsive to the operation of said key to advance said group switching device to the next trunk and said master switching device to the next group.

26. In a trunking system, operator's positions, outgoing lines, a plurality of groups of trunks incoming at each position, a group switching device common to each group of trunks, a master switching device at each position, an operator's telephone common to a plurality of positions, means controlled by said group and master switching devices to associate said operator's telephone with a trunk to which a connection has been extended, means thereupon effective to complete said connection to an outgoing line, and means to operate the master switches to which said operator's telephone is common to permit the completion of no more than one connection from each group at each operation of a master switch.

27. In a telephone system, operators' positions, outgoing lines, a plurality of groups of trunks incoming at each position, a group switching device common to each group of trunks, a master switching device at each position, an operator's telephone common to a plurality of positions, means responsive to the seizure of a trunk to cause the association of the corresponding group switching device with said trunk and the association of the master switching device with said group switching device, means controlled by said master switching device and said group switching device to associate said operator's telephone with said trunk, a key in each master switching device, means effective only if said key has been operated to complete a connection to one of said outgoing lines, means responsive to the operation of said key to advance said group switching device to the next trunk and said master switching device to the next group, and means effective after said master switching device has associated the operator's telephone with one trunk in each group to which it has access to associate said operator's telephone with another master switch.

28. In a trunking system, operators' positions, plug ended trunks incoming at said positions, called line jacks at said positions, equipment individual to each position, means responsive to the seizure of one of said trunks at the distant end to cause the association of said trunk with the equipment either at the position in which the trunk is incoming or at an adjacent position, means to signal the corresponding operator, means controlled by said operator for disconnecting said trunk from said equipment, means responsive to the insertion of the plug of said trunk in a called line jack for completing a connection to said called line, means responsive to disconnection at said called line for releasing said trunk at its distant end, and means effective if said trunk is reseized before said plug is removed from said jack to prevent the association of said trunk with the equipment of an adjacent position.

29. In a trunking system, operators' positions, trunks incoming to said positions from an automatically operated exchange, a lamp associated with each trunk, a recorder at each position, means responsive to the extension of a connection to one of said trunks to associate any one of a plurality of recorders with said trunk, means thereupon effected to intermittently light said lamp at a rate characteristic of the recorder associated with said trunk, operator controlled means for disconnecting said recorder from said trunk and extinguishing said lamp and for extending said connection to a called subscriber, and means responsive to the release of said connection by the called subscriber to light said lamp steadily as a disconnect signal.

30. In a trunking system, operators' positions, plug ended trunks incoming to said positions from an automatically operated exchange, a lamp associated with each trunk, called line jacks at each position, a recorder at each position, means responsive to the seizure of one of said trunks at the distant end to associate said trunk with a recorder either at the position in which said trunk is incoming or at an adjacent position, means thereupon effective to intermittently light said lamp at a rate characteristic of the recorder associated with said trunk, operator controlled means for disconnecting said recorder from said trunk and extinguishing said lamp, means responsive to the insertion of the trunk plug in the called line jack for completing a connection to the called line, means responsive to the release of said connection at said called line to permit the reseizure of said trunk, and means effective if said trunk is reseized before said plug is removed from the called line jack to prevent the association of said trunk with the equipment at an adjacent position.

In witness whereof, we hereunto subscribe our names this 15th day of August, A. D., 1927.

WILLIAM A. RHODES.
JACK F. DAHL.